US010618391B2

(12) United States Patent
Cook

(10) Patent No.: US 10,618,391 B2
(45) Date of Patent: Apr. 14, 2020

(54) RETRACTABLE CANOPY FOR A VEHICLE

(71) Applicant: The Perry Company, Waco, TX (US)

(72) Inventor: Jerrod Chance Cook, Hewitt, TX (US)

(73) Assignee: THE PERRY COMPANY, Waco, TX (US)

(*) Notice: Subject to any disclaimer, the term of this patent is extended or adjusted under 35 U.S.C. 154(b) by 0 days.

(21) Appl. No.: 15/899,256

(22) Filed: Feb. 19, 2018

(65) Prior Publication Data

US 2018/0257468 A1  Sep. 13, 2018

Related U.S. Application Data

(63) Continuation-in-part of application No. 15/811,673, filed on Nov. 13, 2017, now abandoned.

(60) Provisional application No. 62/421,206, filed on Nov. 11, 2016.

(51) Int. Cl.
| | |
|---|---|
| B60J 7/12 | (2006.01) |
| B60R 21/13 | (2006.01) |
| B60J 7/185 | (2006.01) |
| A01D 67/02 | (2006.01) |
| A01D 75/20 | (2006.01) |

(52) U.S. Cl.
CPC .......... *B60J 7/12* (2013.01); *A01D 67/02* (2013.01); *B60J 7/1265* (2013.01); *B60J 7/1856* (2013.01); *A01D 75/20* (2013.01); *B60J 7/1278* (2013.01); *B60R 2021/134* (2013.01)

(58) Field of Classification Search
CPC . A01D 34/00; B60J 7/1278; B60J 7/12; B60J 7/1856; B60R 21/131–132; B60R 21/134

USPC .......... 296/100.04, 107.01–128, 190.03; 280/756; 135/128, 143; 16/343
See application file for complete search history.

(56) References Cited

U.S. PATENT DOCUMENTS

| | | | |
|---|---|---|---|
| 4,008,874 A | 2/1977 | Conway | |
| 4,927,117 A | 5/1990 | Gainey | |
| 5,232,005 A | 8/1993 | Mitchell | |
| 5,240,020 A | 8/1993 | Byers | |
| 5,560,383 A | 10/1996 | Fuller | |
| 5,579,795 A | 12/1996 | Colbo | |

(Continued)

FOREIGN PATENT DOCUMENTS

| | | | |
|---|---|---|---|
| EP | 1197399 | * | 9/2001 |
| GB | 816810 | * | 8/1929 |

*Primary Examiner* — Dennis H Pedder
(74) *Attorney, Agent, or Firm* — Scheinberg & Associates, PC; Michael O. Scheinberg

(57) ABSTRACT

A retractable canopy for a vehicle, the retractable canopy moving independently of a vehicle roll bar being retracted or raised. Canopies for weather protection both from excessive exposure to the sun and from precipitation are commonly used on many types of vehicles, which in many cases may be motorized. For safety reasons, and often also legal requirements, these vehicles may be equipped with a roll bar or similar structure to protect the operator of the vehicle from injury in the event that the vehicle rolls over. When the vehicle encounters a low-lying obstruction, the canopy may be quickly lowered to enable the vehicle to travel underneath and past the obstruction, after which the canopy may be quickly raised again. Raising or lowering of the canopy is independent of whether the roll bar is raised or lowered, and raising or lowering of the roll bar is independent of the canopy position.

26 Claims, 14 Drawing Sheets

(56) References Cited

U.S. PATENT DOCUMENTS

| | | |
|---|---|---|
| 5,842,732 A | 12/1998 | Daggett et al. |
| 6,059,351 A | 5/2000 | Ehnes |
| 6,105,594 A | 8/2000 | Diaz |
| 6,216,714 B1 | 4/2001 | Tucker |
| 6,220,647 B1 | 4/2001 | Winkler |
| 6,607,002 B2 | 6/2003 | Reese |
| 6,802,327 B2 | 10/2004 | Koss |
| 7,255,121 B2 | 8/2007 | Milner et al. |
| 7,585,020 B1 * | 9/2009 | Wahl, Jr. .............. A47C 7/66 297/184.15 |
| 7,845,364 B2 | 12/2010 | Tolmie |
| 7,861,735 B2 * | 1/2011 | Stepaniuk ............ A61G 5/10 135/66 |
| 8,528,924 B1 * | 9/2013 | Bartel ................ B60R 21/13 280/156 |
| 8,752,498 B1 | 6/2014 | Schwindaman et al. |
| 8,845,004 B2 | 9/2014 | DeVoss |
| 9,616,837 B1 * | 4/2017 | Bartel ................ B60R 21/131 |
| 2009/0183757 A1 | 7/2009 | Koch |
| 2011/0146737 A1 | 6/2011 | Friedman et al. |
| 2011/0271993 A1 | 11/2011 | Benish et al. |
| 2011/0309651 A1 | 12/2011 | Hernandez et al. |
| 2014/0000667 A1 | 1/2014 | Biers |
| 2014/0084621 A1 | 3/2014 | DeVoss |
| 2016/0177593 A1 | 6/2016 | Richmeier |

\* cited by examiner

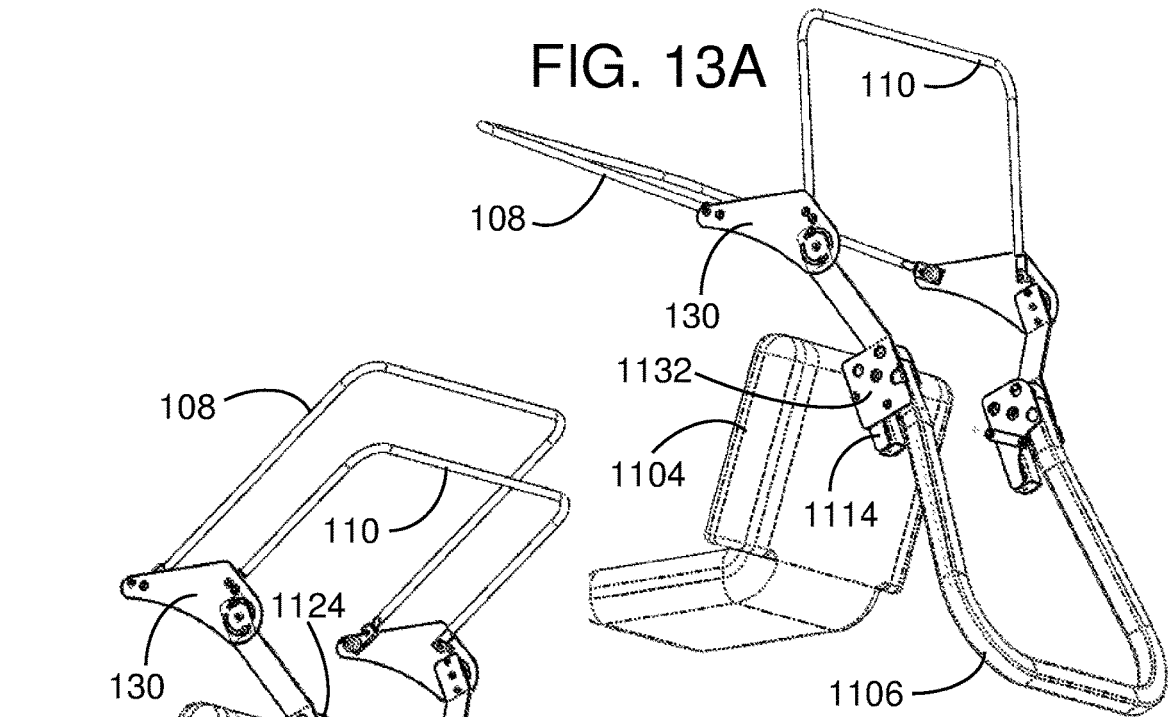
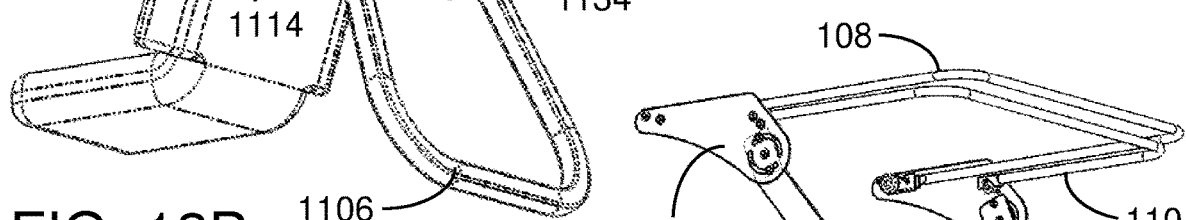
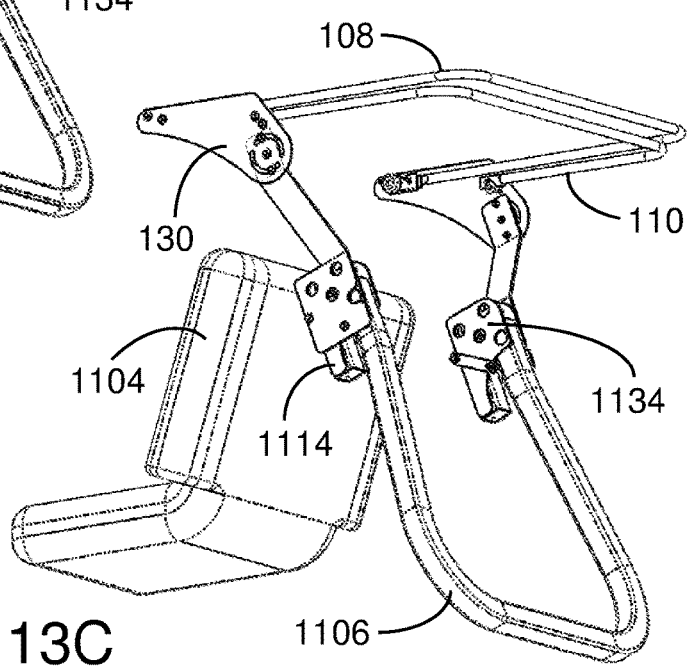

RETRACTABLE CANOPY FOR A VEHICLE

RELATED APPLICATIONS

This application is a continuation-in-part of U.S. patent application Ser. No. 15/811,673, filed Nov. 13, 2017, which is incorporated herein by reference and which claims priority from U.S. Prov. Pat. App. No. 62/421,206, filed Nov. 11, 2016.

TECHNICAL FIELD

The present disclosure relates to canopies for vehicles, and in particular, to retractable canopies.

BACKGROUND

Canopies on vehicles such as lawn tractors, All-terrain vehicles (ATVs) and utility vehicles (UTVs) can provide weather protection from both excessive exposure to the sun and from precipitation. For example, U.S. Pat. No. 6,220,647 to Winker for a "Retractable Awning for a Golf Cart" describes a retractable awning for a golf cart. U.S. Pat. No. 6,059,351 to Ehnes for a "Vehicle Canopy Apparatus" describes a canopy for a vehicle and includes inner and outer canopy support assemblies which in inner and outer top transverse canopy beams. U.S. Pat. Pub. 2009/0183757 of Koch, III for a "Lawn Mower Shade," describes a rear mounted support frame that has a canopy attached to the top portion for the user's protection from environmental conditions. U.S. Pat. No. 7,255,121 for a Portable Vehicle Canopy" describes a canopy for a front engine riding lawn mower that affixes to the vehicle using a suction cup.

For safety, and sometimes regulatory requirements, vehicles may be equipped with a roll bar or similar structure to protect the operator of the vehicle from injury in the event that the vehicle rolls over. To provide adequate protection for the operator, the roll bar should extend above a level corresponding to the expected top of any operator's head—roll bars are typically located just behind the operator's seat, thereby maximizing protection for the operator. In some cases, the roll bar may comprise a cage-like structure with one or more additional roll bars in front of the operator's seat which may be connected to the rear roll bar by additional structures.

In many instances, operation of the vehicle may involve travel wherein low-lying obstacles may be encountered, such as tree-limbs or other low overhanging (immovable) structures. In some cases, these obstacles may be lower than the height of the canopy and/or the height of the roll-bar. When it is impossible or undesirable to drive around these obstacles, it may be advantageous to be able to lower the canopy and/or the roll bar until the obstacle has been passed, after which the canopy and/or roll bar would be restored to its raised position.

A landscaping machine having a roll bar and a covering system is described, for example, in US. Pat. Pub. 2014/0000667 of Biers, Sr. for a "Landscaping Machine, Landscaping Machine Cover, and Method of Use thereof." The cover of Biers, Sr. is deployed to cover the machine when it is not in use.

SUMMARY

An object of the disclosure herein is to provide a retractable canopy for a vehicle that also has a roll bar, which may also be retractable.

The canopy is affixed to the vehicle such that the canopy can be raised or lowered regardless of whether the roll bar is in a raised or lowered position.

The foregoing has outlined rather broadly the features and technical advantages of the present disclosure in order that the detailed description that follows may be better understood. Additional features and advantages will be described hereinafter. It should be appreciated by those skilled in the art that the conception and specific embodiments disclosed herein may be readily utilized as a basis for modifying or designing other structures for carrying out the same purposes of the present disclosure. It should also be realized by those skilled in the art that such equivalent constructions do not depart from the scope of the invention as set forth in the appended claims.

BRIEF DESCRIPTION OF THE DRAWINGS

For a more thorough understanding of the present disclosure, and advantages thereof, reference is now made to the following descriptions taken in conjunction with the accompanying drawings, in which:

FIGS. 13A-13C show rear left isometric views of the canopy in raised, partially-lowered, and lowered positions, respectively, where the roll bar is fully-lowered.

DETAILED DESCRIPTION OF EMBODIMENTS

Figure 1A:
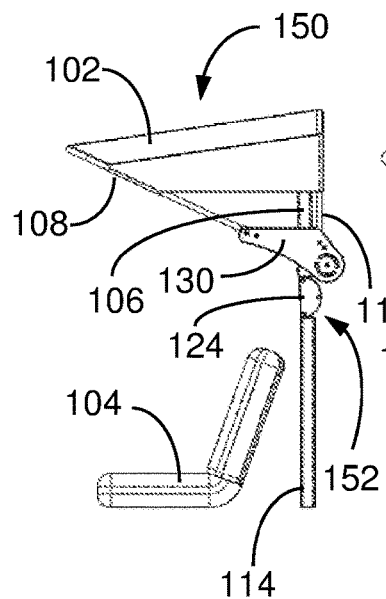
FIGS. 1A-1C show side, front left, and rear left views, respectively, of a canopy and roll bar with both in a raised position.

The callouts in the listing below apply to the descriptions of embodiments in FIGS. 1A-15D:
102 canopy top
104 operator seat
106 roll bar
108 front canopy support
108A locking slot plate
110 rear canopy support
111 canopy bracket assembly
112 canopy rear
114 roll bar support
124 roll bar pivot bracket
130 canopy support bracket
132 canopy mounting bracket
134 canopy mounting plate
140 pivoting connection
142 pivoting connection
143 pivot stop
144 pivoting connection
145A locking mechanism
145B locking mechanism
146 slot in locking slot plate 108A
150 retractable canopy assembly
152 retractable roll bar assembly
906 roll bar
914 roll bar support
924 roll bar pivot bracket
970 canopy extension bracket
1104 operator seat
1106 roll bar
1114 roll bar support
1132 canopy mounting bracket
1134 canopy mounting plate
1402 support structure
1408 mounting bolt
1432 canopy mounting bracket
1434 canopy mounting plate
1502 support structure
1508 mounting bolt
1532 canopy mounting bracket
1534 canopy mounting plate
1606 roll bar
1608 front canopy support
1610 rear canopy support
1614 roll bar support
1624 roll bar pivot bracket
1630 canopy support bracket
1632 canopy mounting bracket
1634 canopy mounting plate
1642 locking mechanism mounting stud
1645 locking mechanism
1660 pivoting connection
1670 canopy extension bracket

Various Embodiments

FIGS. 1A-6C illustrate three elements of a vehicle that may be fitted with embodiments disclosed herein. Referring to FIG. 1A, these three elements are: an operator's seat 104, a retractable roll bar assembly 152, and a retractable canopy assembly 150. The retractable canopy assembly 150 may be used on a vehicle in which the roll bar may be moved between a raised position and a lowered position. The retractable canopy may also be used on a vehicle with a fixed roll bar or no roll bar. The retractable canopy may be movable between a deployed position in which the canopy shields the vehicle operator and a retracted position in which the canopy is lowered to avoid obstacles, such as tree branches. The canopy may be affixed to the vehicle such that the canopy may be moved between the deployed position and the retracted position regardless of whether the roll bar is in the raised or lowered position.

The retractable canopy may be installed on the vehicle as an after-market addition or may be installed on a new vehicle by its manufacturer. The forward (canopy assembly raised) range of pivoting travel of a front canopy support 108 may be determined, now referring to FIG. 8A, by a locking mechanism 145A—the front canopy support 108 also may include, now also referring to FIG. 8B, a slot 146 (which may be configured within a locking slot plate 108A attached to the end of front canopy support 108) which fits with the locking mechanism 145A, thereby operating to prevent further pivoting of the front canopy support 108 in a forward or rearward direction. In some embodiments, the locking mechanism 145A may include a screw threaded into a tapped hole in a canopy support bracket 130. In other embodiments, the locking mechanism may include a stud, such as a threaded stud fixed to, and protruding from, the canopy support bracket 130 with a locking nut threaded onto the stud. In some embodiments, a locking mechanism 145B may be coaxial with pivoting connection 142 (see FIGS. 10A-10C). The rearward (canopy assembly lowered) range of pivoting travel of front canopy support 108 may be limited by, for example, the front canopy support 108 pivoting until it lies, now also referring to FIG. 8C, on top of a rear canopy support 110. The forward (canopy assembly raised) range of pivoting travel of rear canopy support 110 may be limited by a pivot stop 143 which prevents rear canopy support 110 from moving past a vertical position in the forward direction. The rearward (canopy assembly lowered) range of pivoting travel of front canopy support 108 may be limited by, for example, the rear canopy support 110 pivoting until it lies on top of pivot stop 143. Pivot stop 143 may comprise a pin fixed to, and protruding from, the canopy support bracket 130. Referring again to FIG. 1A, a roll bar 106 may be retractable. The retractable roll bar assembly 152 may comprise, for example, the roll bar 106 and two roll bar supports 114. Referring now also to the drawings of FIGS. 7A-7C and 8A-8C, these show close-up side and rear left views, respectively, of the canopy support structure for the canopy in raised, partially-lowered, and lowered positions, respectively for each set of drawings. A roll bar pivot bracket 124 (FIGS. 7A and 8A) may connect the roll bar 106 and the roll bar supports 114 to allow the roll bar to pivot to a partially- or fully-lowered position. Referring now to FIGS. 1A-2C, FIG. 7C, and FIG. 8B, the retractable canopy assembly 150 may include a canopy top 102 (FIGS. 1A-2C), the front canopy support 108, the rear canopy support 110, a canopy rear 112 (FIG. 1C), and a canopy bracket assembly 111 (FIG. 7C), which may comprise, now referring to FIG. 8B, the canopy support bracket 130, a canopy mounting bracket 132 (FIG. 8B), a canopy mounting plate 134 (FIG. 8B), and a pivoting connection 140 (FIG. 8B). Various bolts, nuts, washers, and pins, may be used to mount the canopy and, to avoid unnecessarily cluttering the disclosure, these are not always described in detail herein.

Raising retractable canopy assembly 150 may typically involve motion in a first direction (pivoting forward and upward in some embodiments) and lowering of retractable canopy assembly 150 may typically involve motion in a second direction (pivoting backward and downward in some embodiments), the second direction being opposite from the first direction. Raising retractable roll bar 106 may typically require motion in a third direction (pivoting forward and upward in some embodiments) and lowering retractable roll bar 106 may typically require motion in a fourth direction (pivoting backward and downward in some embodiments), the fourth direction being opposite from the third direction.

In some embodiments, motion of the canopy assembly may be independent of the motion of the retractable roll bar. Independent motion may be facilitated by making the canopy assembly large enough to fit around the outside of the roll bar. That is, the canopy supports are configured to be wider than the roll bar so that they can rotate around the roll bar to the retracted position when the roll bar is in the deployed (raised) position. The pivot points on the brackets for the front and rear canopy supports are positioned on the outside of the roll bar to facilitate the rotation. Independent motion may by facilitated by making the canopy assembly small enough to fit within the inside of the roll bar. In such cases, the pivot points are positions on the brackets for the front and rear canopy supports are positioned on the inside of the roll bar to facilitate the rotation. Various such configurations fall within the scope of the disclosure.

A First Embodiment

FIGS. 1A-4C show views of a first embodiment of a retractable canopy, a roll bar and an operator's seat in various configurations wherein the canopy and roll bar can be independently positioned: the canopy in either a raised or lowered position, and the roll bar in either a raised or lowered position. FIGS. 5A-6C show views with the canopy in a partially-lowered position and the roll bar in both raised and lowered positions. FIGS. 7A-8C show close-up views of the canopy bracket assembly 111 which enables the independent motions of the canopy and roll bar.

Figure 1B:
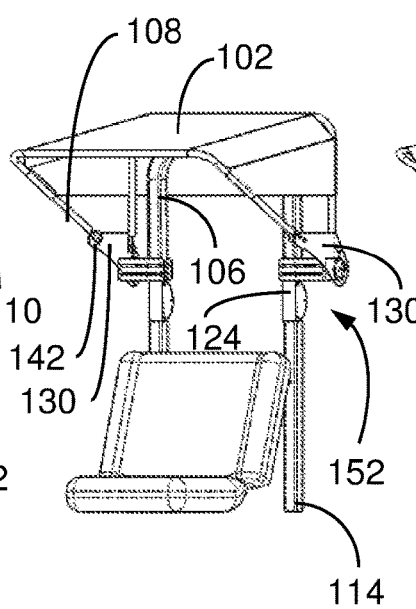
Figure 1C:
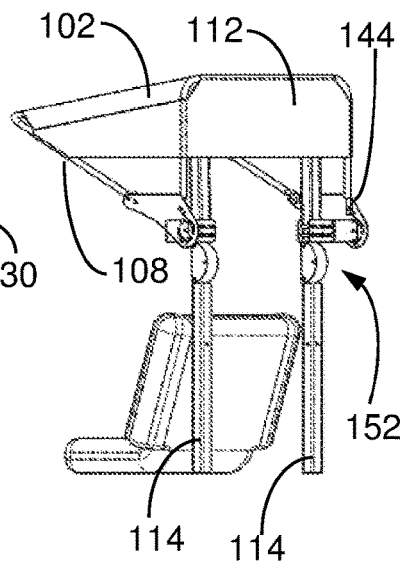

Referring now to FIGS. 1A-1C, these drawings show side, front left, and rear left views, respectively, of the canopy and roll bar with both in a raised position. The canopy and roll bar configurations in FIGS. 7A and 8A correspond to those of FIG. 1A. The configuration in FIGS. 1A-1C may be a normal operating configuration for a first embodiment—the roll bar 106 may be raised for safety and the canopy top 102 may be raised to provide weather protection for the operator against the sun or precipitation. The front of canopy top 102 may be attached to, and supported by, front canopy support 108 which may have a pivoting connection 142 (FIG. 1B) to canopy support bracket 130. The rear of canopy top 102 may be attached to, and supported by, rear canopy support 110, which may have a pivoting connection 144 (FIG. 1C) to canopy support bracket 130. In some embodiments, pivoting connections 142 and 144 may comprise pins fitting through holes, or into rotary bearings, in the lower ends of front and rear canopy supports 108 and 110, respectively, wherein the pins may be fixed to, and protrude from, canopy support bracket 130. In some embodiments, pivoting connections 142 and 144 may comprise pins attached to the lower ends of front and rear canopy supports 108 and 110, wherein the pins protrude into holes, or bearings, in canopy support bracket 130. In some embodiments, pivoting connections 142 and 144 may be coaxial, with independent pivoting motion of front canopy support 108 (pivoting connection 142) and rear canopy support 110 (pivoting connection 144). Further details on potential canopy support assembly configurations are provided in FIGS. 7A-8C. FIG. 1B shows that the two canopy support brackets 130 are mounted outboard of the retractable roll bar assembly 152, thus the front 108 and rear 110 canopy supports are free to pivot past the roll bar without interference. In other embodiments, the two canopy support brackets may be mounted inboard of the retractable roll bar assembly, also enabling the canopy to pivot past the roll bar without interference. Similarly, the roll bar 106 and roll bar pivot bracket 124 (which are fixedly connected) are free to pivot together with respect to the roll bar supports 114 without interference from the retractable canopy assembly 150. The configuration in FIGS. 1A-1C may be reached by raising the roll bar from the vehicle configuration in FIGS. 2A-2C, and by raising the canopy from the vehicle configuration in FIGS. 4A-4C—this highlights the independent up/down positioning of the canopy with respect to the roll bar, as well as the independent up/down positioning of the roll bar with respect to the canopy.

Figure 2A:
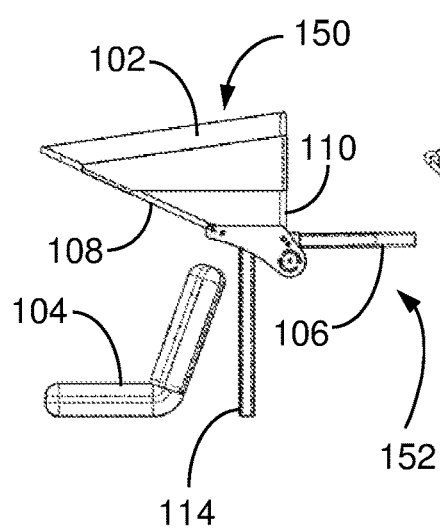
FIGS. 2A-2C show side, front left, and rear left views, respectively, of the canopy in a raised position, where the roll bar is lowered.
Figure 2B:
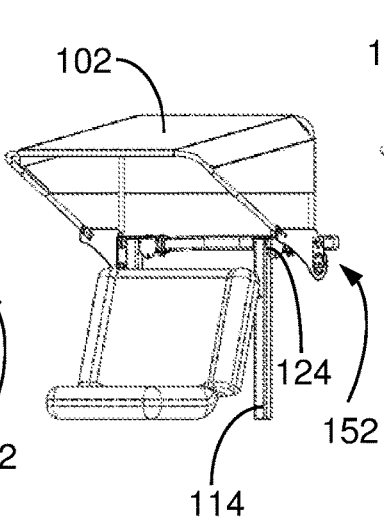
Figure 2C:
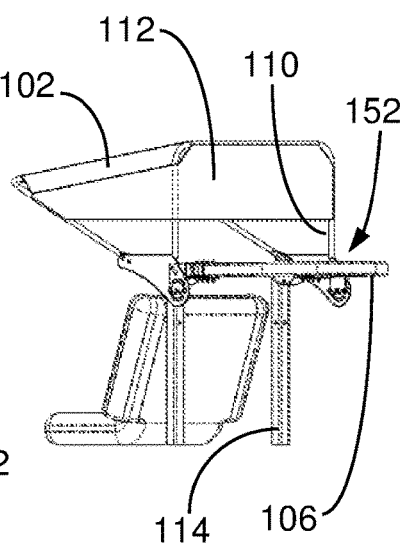

Referring to FIGS. 2A-2C, side, front left, and rear left views, respectively, are shown of the canopy in a raised position—similar to FIGS. 1A-1C, but now with the roll bar 106 in a lowered position, where roll bar pivot bracket 124 has facilitated a rotation clockwise from the position of roll bar 106 in FIGS. 1A-1C; roll bar pivot bracket 124 is occluded from view in FIGS. 2A and 2C, but an inner view is present in FIG. 2B. In the embodiment shown in FIGS. 1A-8C, roll bar pivot bracket 124 is mounted on roll bar 106, so that when the operator wants to lower the roll bar 106, the operator may loosen the attachment of the canopy support bracket 130 to the roll bar 106, then pivot the roll bar 106 back while holding the canopy support bracket 130 stationary, and then to retighten the attachment of the canopy support bracket 130 to the roll bar 106—this sequence of steps preserves the orientation of the canopy support bracket 130 as shown in FIGS. 1A-1C and 2A-2C. In other embodiments, canopy support bracket 130 may be attached below roll bar pivot bracket 124, and in these embodiments, roll bar 106 may pivot between a raised and retracted position without affecting the canopy support bracket 130—in these embodiments, loosening an attachment of the canopy support bracket may not be required.

Figures 3A, 3B, 3C:
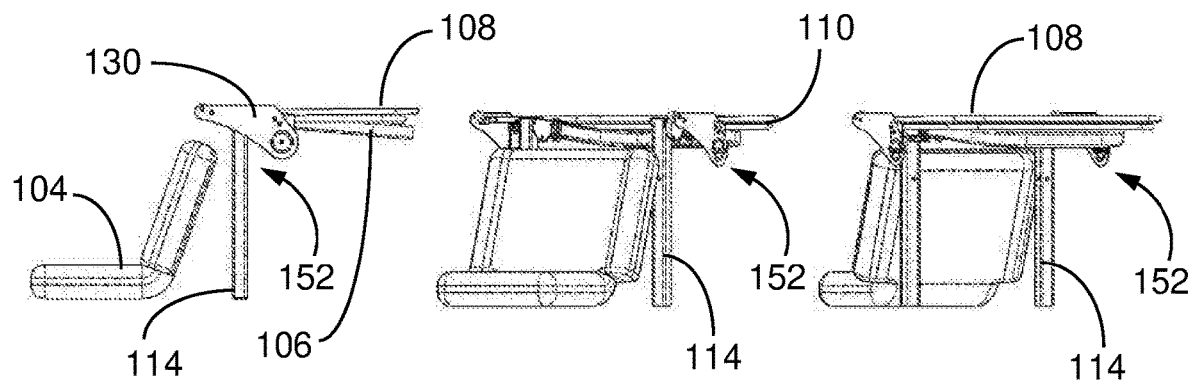
FIGS. 3A-3C show side, front left, and rear left views, respectively, of the canopy and roll bar with both in a lowered position.

The configuration in FIGS. 2A-2C may be reached by lowering the roll bar from the vehicle configuration in FIGS. 1A-1C, or by raising the canopy from the vehicle configuration in FIGS. 3A-3C. In FIGS. 2A-2C, roll bar pivot bracket 124 is illustrated being fixedly-attached to roll bar 106 and pivotally-attached to roll bar support 114. In other embodiments, roll bar pivot bracket 124 may be pivotally-attached to roll bar 106 and fixedly-attached to roll bar support 114. In yet other embodiments, roll bar pivot bracket 124 may be pivotally-attached to both roll bar 106 and roll bar support 114. Although the angle between the raised position of roll bar 106 (FIGS. 1A-1C) and the lowered position of roll bar 106 (FIGS. 2A-2C) is illustrated as approximately 90°, in various embodiments this angle may be less than 90° (wherein the "retracted" roll bar position would be angled up and back) or greater than 90° (wherein the "retracted" roll bar position would be angled down and back).

FIGS. 3A-C show side, front left, and rear left views, respectively, of the canopy and roll bar with both in a lowered position. For clarity, canopy top 102 and canopy rear 112 have been omitted, however front canopy support 108 and rear canopy support 110 are shown rotated approximately 90° clockwise relative to FIGS. 1A-2C (see above for comments about various values for this angle). Note that pivoting connection 142 (FIG. 8A) for front canopy support 108 may be slightly higher on canopy support bracket 130 than pivoting connection 144 (FIG. 8B) for rear canopy support 110—this arrangement may facilitate tighter folding of the canopy when in the lowered position. Canopy support bracket 130 remains essentially in the same orientation as in FIGS. 2A-2C. An operator of a vehicle might set this configuration in order to pass beneath a low obstruction. After passing this obstruction, the canopy and roll bar typically could be returned to the configuration in FIGS. 1A-1C for both safety (roll bar up) and weather protection against the sun or precipitation (canopy up). The configuration in FIGS. 3A-3C may be reached by lowering the roll bar from the configuration in FIGS. 4A-4C, or by lowering the canopy from the configuration in FIGS. 2A-2C.

Figures 4A, 4B, 4C:
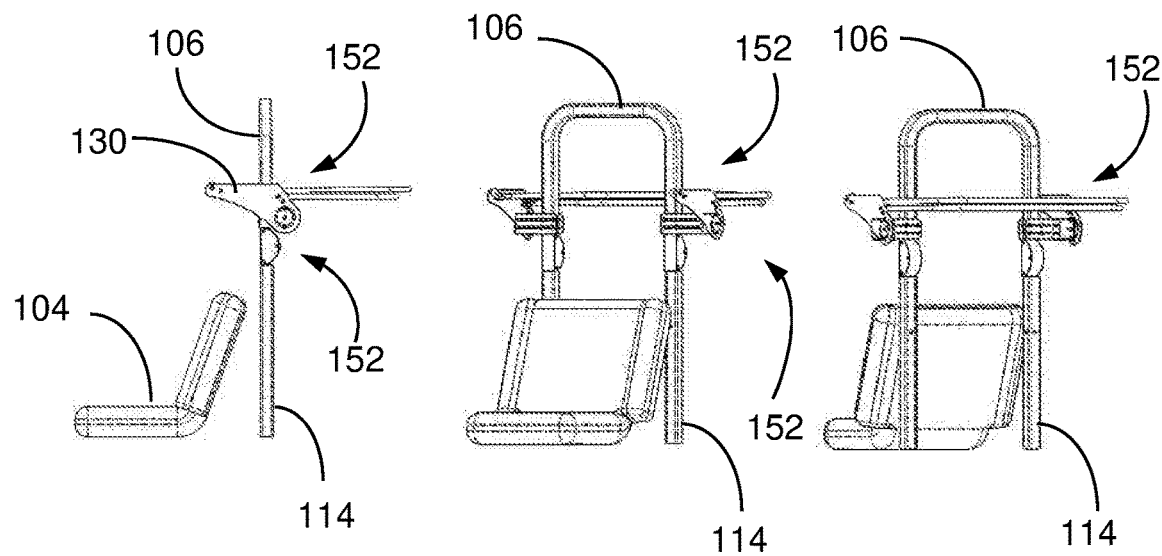
FIGS. 4A-4C show side, front left, and rear left views, respectively, of the canopy in a lowered position, where the roll bar is raised.

FIGS. 4A-4C show side, front left, and rear left views, respectively, of the canopy in a lowered position, with the roll bar in a raised position. The configuration in FIGS. 7C and 8C corresponds to the configuration in FIGS. 4A-4C. This might be a preferred operating configuration for the vehicle, for example, on cloudy days when weather protection from the sun is unnecessary, or at times of the day when the sun is lower in the sky and not as bright. This might also be a temporary operating configuration for passing beneath, or adjacent to, an object such as a bush which might snag and damage the material of canopy top 102 but which would not adversely affect the roll bar (which therefore need not be retracted). Again, for clarity, canopy top 102 and canopy rear 112 are not shown, while front canopy support 108 and rear canopy support 110 are shown in the same position as in FIGS. 3A-3C. The vehicle configuration in FIGS. 4A-4C may be reached by raising the roll bar from the configuration in FIGS. 3A-3C, or by lowering the canopy from the vehicle configuration in FIGS. 1A-1C.

Figures 5A, 5B, 5C:
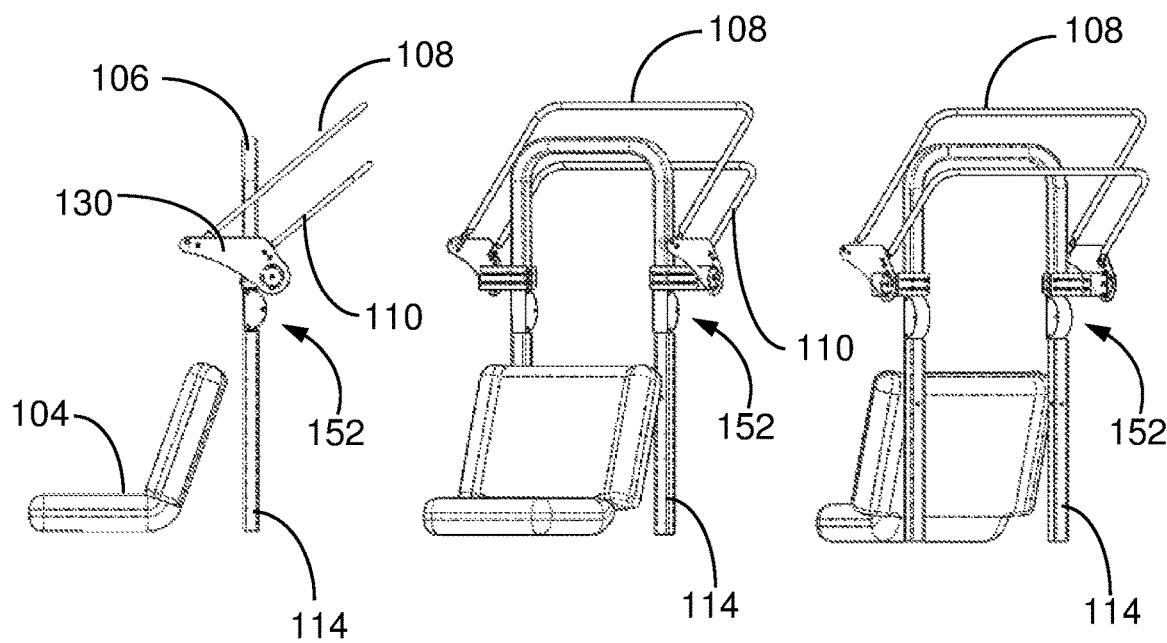
FIGS. 5A-5C show side, front left, and rear left views, respectively, of the canopy in a partially-lowered position, where the roll bar is raised.

FIGS. 5A-5C show side, front left, and rear left views, respectively, of the retractable canopy assembly 150 in a partially-lowered position (canopy top 102 and canopy rear 112 are omitted for clarity), with the roll bar in a raised position. The configuration in the close-up views of FIGS. 7B and 8B correspond to the configuration in FIGS. 5A-5C. This configuration corresponds to lowering the canopy to transition from the fully raised canopy/fully raised roll bar configuration shown in FIGS. 1A-1C to the fully lowered canopy/fully raised roll bar configuration shown in FIGS. 4A-4C, or to raising the canopy going from the fully lowered canopy/fully raised roll bar configuration shown in FIGS. 4A-4C to the fully raised canopy/fully raised roll bar configuration shown in FIGS. 1A-1C. The front left and rear left views of FIGS. 5B and 5C illustrate how the canopy fits around the roll bar as it pivots up and down.

Figures 6A, 6B, 6C:
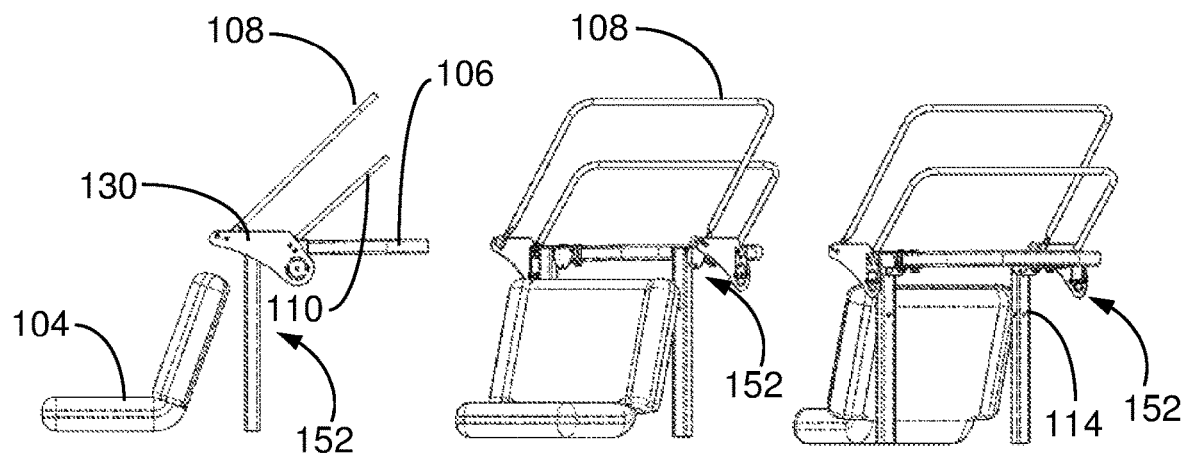
FIGS. 6A-6C show side, front left, and rear left views, respectively, of the canopy in a partially-lowered position, where the roll bar is lowered.

FIGS. 6A-6C show side, front left, and rear left views, respectively, of the retractable canopy assembly 150 in a partially-lowered position (again with canopy top 102 and canopy rear 112 omitted for clarity), with the roll bar in a lowered position. This configuration corresponds to lowering the canopy to transition from a configuration as shown in FIGS. 2A-2C to a configuration as shown in FIGS. 3A-3C, and to raising the canopy going from FIGS. 3A-3C to FIGS. 2A-2C.

Operation of the Canopy Support Assembly of a First Embodiment

Figures 7A, 7B, 7C:
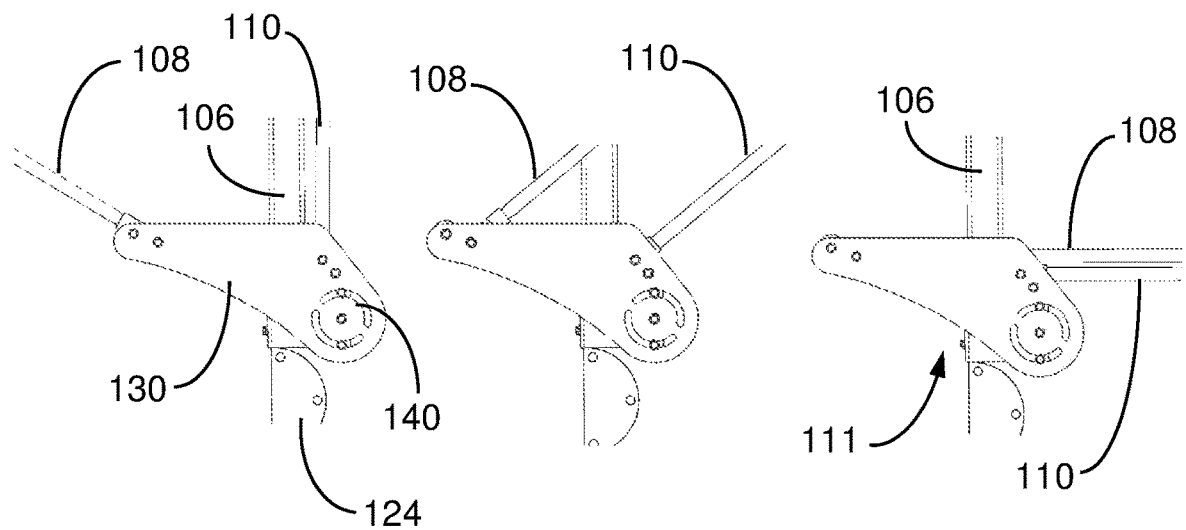
FIGS. 7A-7C show close-up side views of the canopy support structure for the canopy in raised, partially-lowered, and lowered positions where the roll bar is raised.
Figures 8A, 8B, 8C:
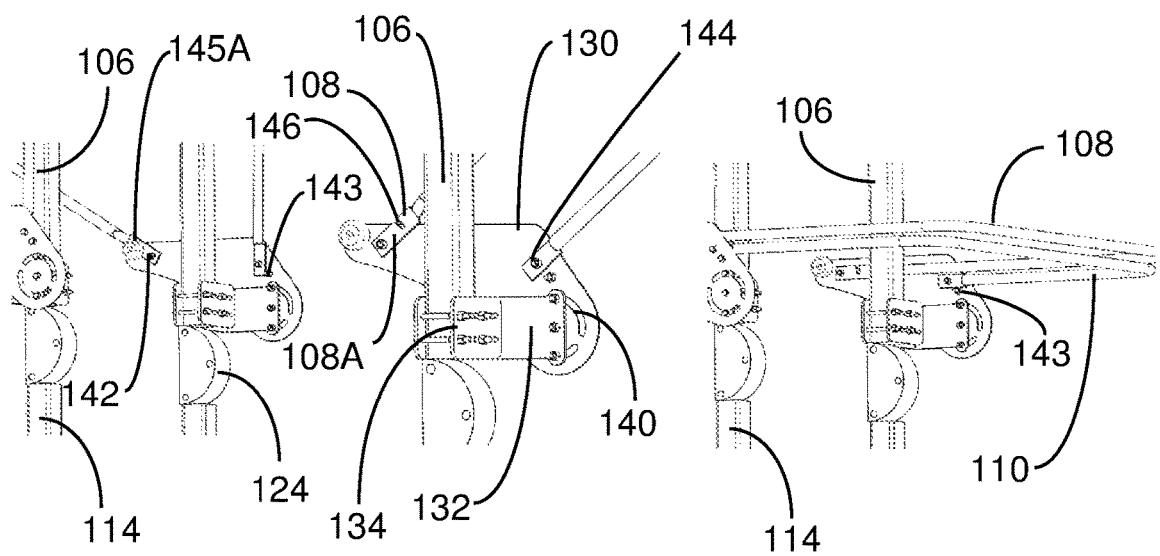
FIGS. 8A-8C show close-up rear left views of the canopy support structure for the canopy in raised, partially-lowered, and lowered positions where the roll bar is raised.

FIGS. 7A-7C are side views illustrating the operation of the canopy support assembly of the first embodiment illustrated in FIGS. 1A-6C where, as an example, roll bar 106 is in a fully raised position and the canopy is in various positions. In FIG. 7A, the canopy is in a fully raised position, wherein front canopy support 108 extends toward the upper left, supporting and positioning the front of canopy top 102 (not shown) to cover the operator. Rear canopy support 110 may extend approximately vertically in this embodiment, supporting and positioning the rear of canopy top 102, as well as canopy rear 112 (not shown). FIG. 7B shows both the front canopy support 108 and rear canopy support 110 pivoting clockwise relative to the left side view, as the canopy is moved from a raised to a lowered position. In FIG. 7C, wherein the canopy is fully lowered, both the front canopy support 108 and rear canopy support 110 now extend out approximately horizontally to the right.

FIGS. 8A-8C illustrate the same operational steps as in FIGS. 7A-7C but with the canopy support bracket 130 from a rear inner left perspective. The canopy support bracket 130 may include a pivoting connection 140 to canopy mounting bracket 132, which may include a fixed mounting to roll bar 106 (above roll bar pivot bracket 124) by being fixed to roll bar 106 by canopy mounting plate 134. When an operator wishes to lower the roll bar, while maintaining the canopy in a raised position, a first step may be to loosen the connection between canopy support bracket 130 and canopy mounting bracket 132, after which the roll bar 106 may be rotated from a fully raised position (FIGS. 7A and 8A) to a fully lowered position (FIGS. 7C and 8C). The connection between canopy support bracket 130 and canopy mounting bracket 132 may then be retightened.

In FIGS. 7A-8C, pivoting connection 140 is shown as arcuate slots in canopy support bracket 130, however any type of largely rotary connection which may be tightened and loosened between canopy support bracket 130 and canopy mounting bracket 132 may be used. In some embodiments, the locking mechanism 145A may be configured in proximity to the pivoting connection 142 between front canopy support 108 and canopy support bracket 130 (FIGS. 8A-8C)—when the canopy has been pivoted forward into a raised position, the operator may then tighten this locking mechanism 145A to prevent the canopy from pivoting backwards due to, e.g., either forward acceleration of the vehicle or wind. Locking mechanism 145A may be tightened to clamp front canopy support 108 against canopy support bracket 130, thereby preventing forward or backward pivoting motion of front canopy support 108 until only after locking mechanism 145A may be subsequently loosened by an operator. An advantage of a pivoting connection between roll bar 106 and canopy support bracket 130 (through canopy mounting bracket 132) is that the location of the retractable canopy assembly 150 and its pivoting may be independent, or nearly independent (except for small vertical motion), of the position of roll bar 106. Similarly, the location of the roll bar 106 may be unaffected, or largely unaffected, by the positioning (up/down motion) of the retractable canopy assembly 150. Other types of locking and unlocking mechanisms between front canopy support 108 and canopy support bracket 130, and also between rear canopy support 110 and canopy support bracket 130, fall within the scope of this disclosure.

In the embodiment of FIGS. 1A-8C, the canopy assembly is mounted on the roll bar and supported entirely by the roll bar. That is, in these embodiments, the canopy assembly is not attached directly to the vehicle frame, bumper, or to any vehicle part other than the roll bar. Using the mount shown in FIGS. 1A-8C, the retractable canopy assembly is mounted on the roll ball and the canopy can be deployed or retracted without interference with the roll bar, regardless of whether the roll bar is deployed or retracted. Similarly, the roll bar can be deployed or retracted regardless of whether the canopy is deployed or retracted. That is, these embodiments provide a retractable canopy that is mounted on the roll bar and can be deployed or retracted regardless of the position of the roll bar, and the roll bar can be deployed or retracted regardless of the position of the canopy. In other embodiments, the canopy may be mounted to the frame, seat, or other vehicle part.

A Second Embodiment

FIGS. 9A-10C show views of a second embodiment of a retractable canopy and a roll bar in various configurations wherein the canopy and roll bar can be independently positioned: the canopy to either a fully raised or fully lowered position, and the roll bar to either a fully raised or fully lowered position. Many callouts are the same as in FIGS. 1A-8C because the canopy assembly, including the front canopy support 108 (which may be configured with a locking slot plate 108A), the rear canopy support 110, the canopy top 102 and the canopy rear 112 may be the same for multiple embodiments, where each embodiment may represent a separate installation of the retractable canopy, for example, onto one or more of a multiplicity of motorized vehicle designs by various manufacturers. Various embodiments may comprise different designs of the canopy support bracket and its mounting structure, while still comprising the same canopy assembly design—this highlights the versatility of various embodiments.

Figure 9A:
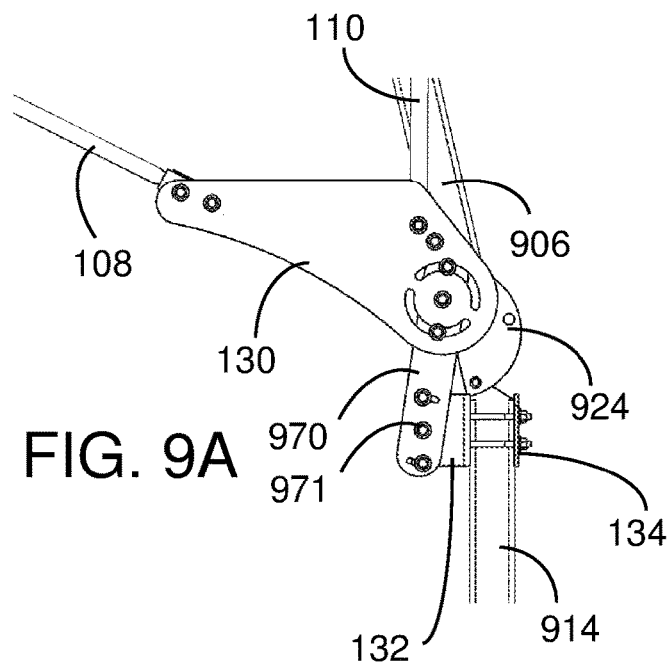
FIGS. 9A-9C show close-up side views of the canopy support structure for the canopy in raised, partially-lowered, and lowered positions, respectively, where the roll bar is raised.
Figure 9B:
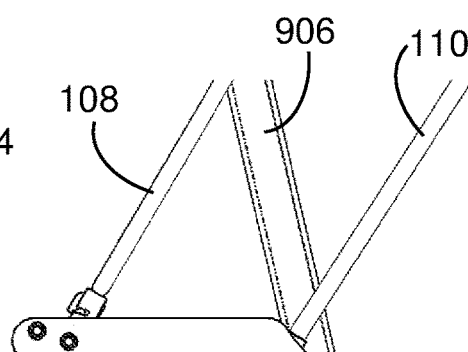
Figure 9C:
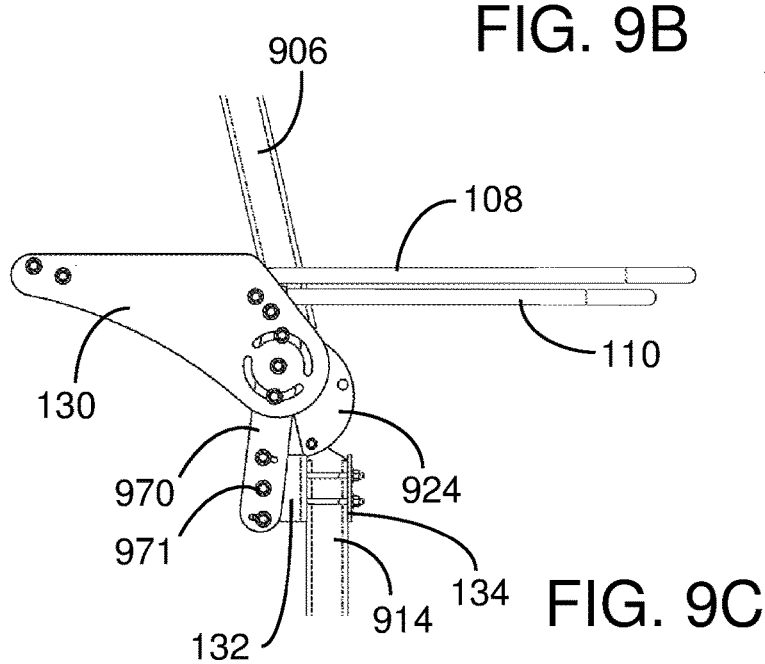

FIGS. 9A-9C show close-up side views of the canopy support structure for the canopy assembly of a second embodiment in fully-raised, partially-lowered, and fully-lowered positions where the roll bar remains fully-raised. Comparisons of FIGS. 9A-9C with FIGS. 7A-7C and FIGS. 8A-8C of the first embodiment show that a difference in the two canopy installations is that the canopy support bracket 130 is mounted on a canopy extension bracket 970 in FIGS. 9A-9C. The other end of canopy extension bracket 970 is mounted with a pivot point 971 on the canopy mounting bracket 132, which is clamped to a roll bar support 914 by the canopy mounting plate 134 below a roll bar pivot bracket 924 this differs from the first embodiment illustrated in FIGS. 7A-7C, in which the canopy mounting bracket 132 (FIG. 8B) is clamped onto roll bar 106 above roll bar pivot bracket 124. Thus, in the embodiment of FIGS. 9A-9C, raising and lowering of a roll bar 906 will not affect the positioning of the canopy assembly. The canopy extension bracket 970 enables canopy support bracket 130 to be positioned roughly at the height of the roll bar pivot bracket 924 in this second embodiment, which may be higher, lower, or at the same height as canopy support bracket 130 in the first embodiment. Canopy extension bracket 970 enables the canopy to be above the roll bar when the canopy is raised, thereby facilitating independent raising/lowering of the canopy with respect to the roll bar, as well as independent raising/lowering of the roll bar with respect to the canopy.

Figure 10A:
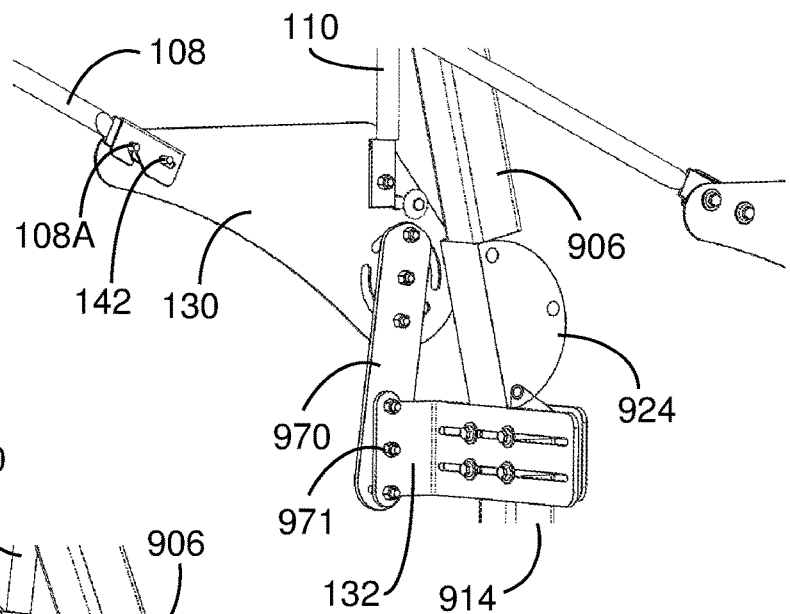
FIGS. 10A-10C show close-up, largely inner front left isometric views of the canopy in raised, partially-lowered and lowered positions, respectively, where the roll bar is raised.
Figure 10B:
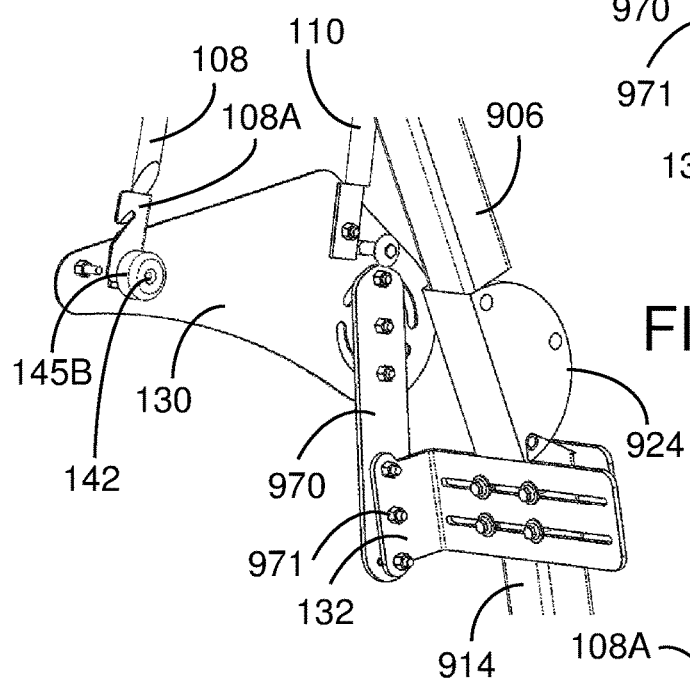
Figure 10C:
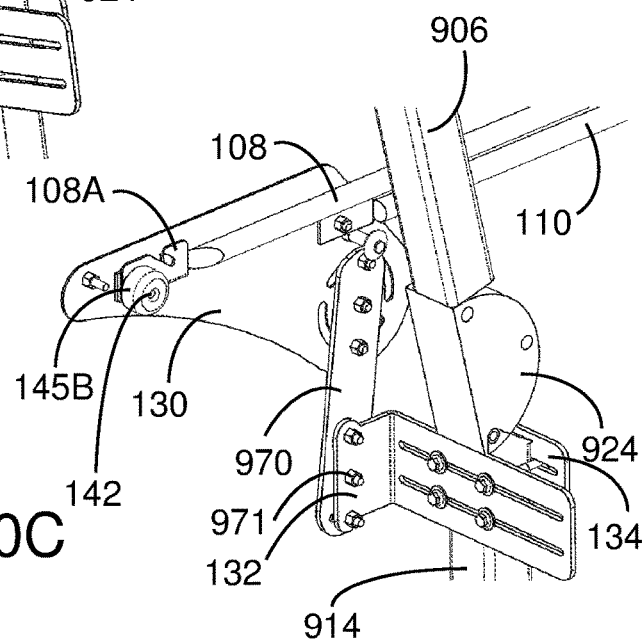

FIGS. 10A-10C show close-up, nearly isometric views of the second embodiment of FIGS. 9A-9C but from largely inner, front left views with the canopy assembly in raised, partially-lowered and lowered positions, respectively, where the roll bar 906 remains raised. In embodiments, canopy mounting bracket has slots as shown to facilitate adjustment of the attachment position of the canopy assembly relative to the roll bar support 914.

A Third Embodiment

FIGS. 11A-13C show views of a third embodiment of a retractable canopy assembly (as in the first and second embodiments), a roll bar 1106 and an operator's seat 1104 in various configurations wherein the canopy and roll bar may be independently positioned: the canopy in either a raised or lowered position, and the roll bar in either a raised or lowered position. Many callouts are the same as in FIGS. 1A-10C because the canopy assembly, including the front canopy support 108, the rear canopy support 110, the canopy top 102 and the canopy rear 112 may be the same for multiple embodiments, as was shown for the second embodiment. The third embodiment may be characterized in that a canopy mounting bracket 1132 is clamped to a roll bar pivot bracket (not shown) by a canopy mounting plate 1134, above a roll bar support 1114—this mounting position differs from the previously described first and second embodiments. Canopy support bracket 130 may be mounted on the extension which is part of the canopy mounting bracket 1132. Pivoting motion of the canopy assembly, for example, between fully-raised and fully-lowered positions may be the same as, or similar to, the pivoting motion described for the first and second embodiments.

Figure 11A:
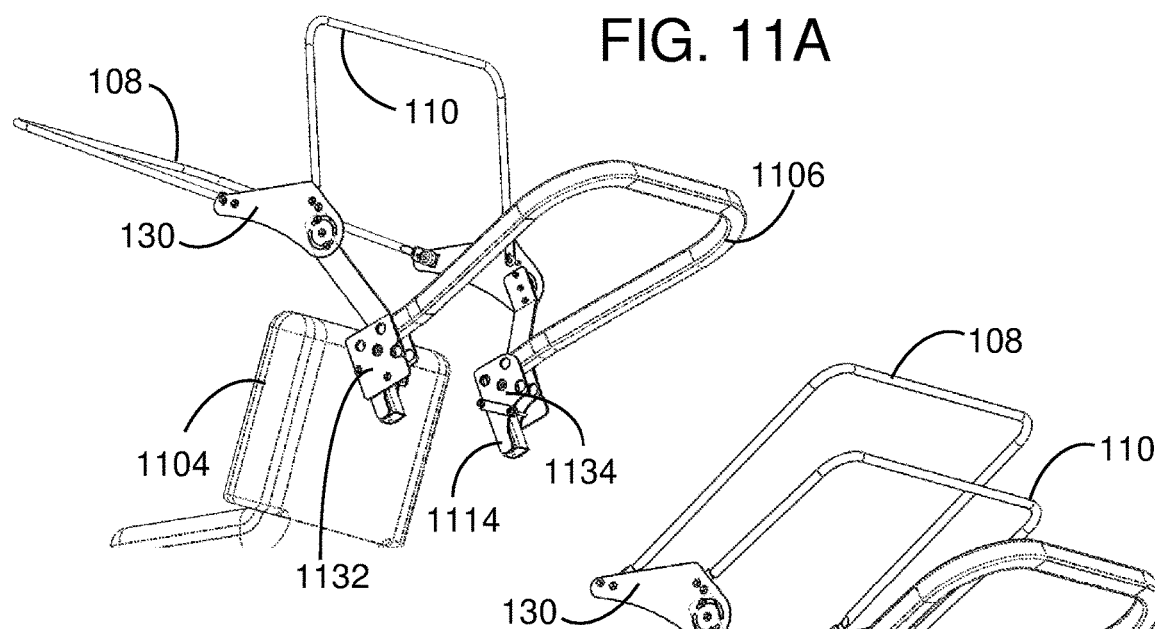
FIGS. 11A-11C show rear left isometric views of the canopy in raised, partially-lowered, and lowered positions, respectively, where the roll bar is partially-lowered.
Figure 11B:
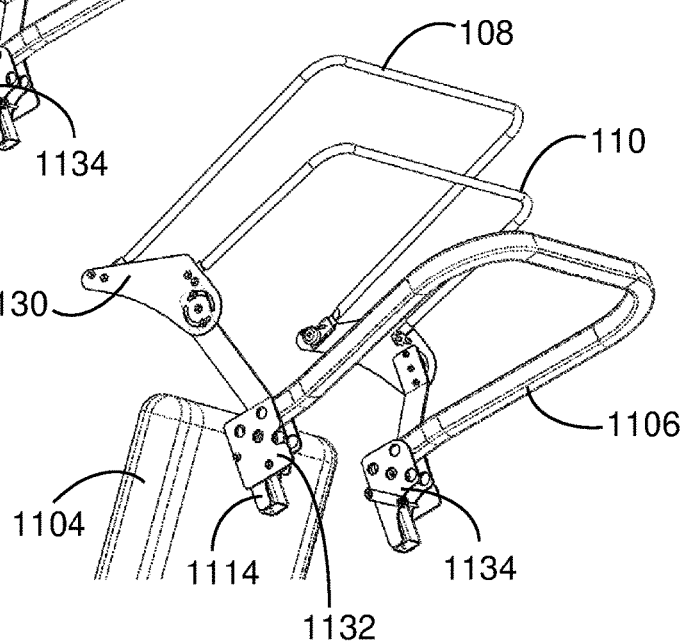
Figure 11C:
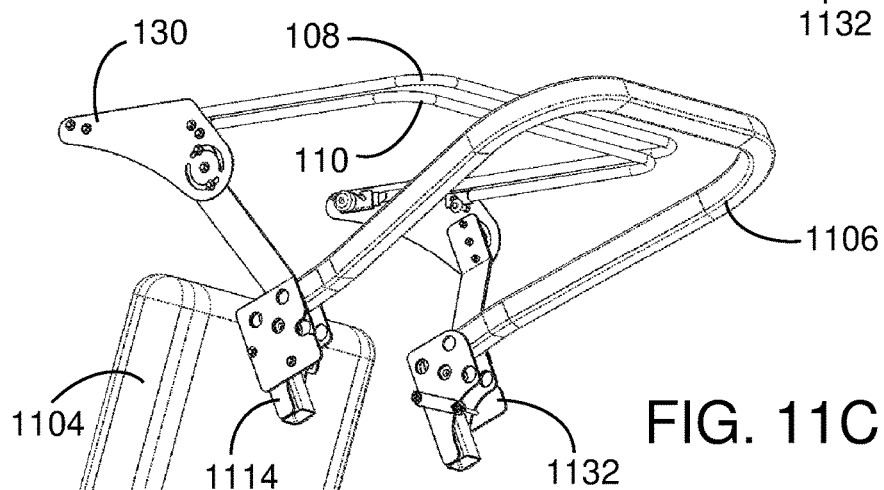

FIGS. 11A-11C show, rear left isometric views of the canopy assembly in raised, partially-lowered, and lowered positions, respectively, where the roll bar is partially-lowered. In the partially lowered position shown here, the roll bar has been pivoted approximately 90° backwards from the raised position shown in FIGS. 12A-12C. The three illustrated positions of the canopy assembly (raised in FIG. 11A, partially-lowered in FIG. 11B, and fully lowered in FIG. 11C) correspond to the positions also illustrated in previous figures for the first and second embodiments.

Figure 12A:
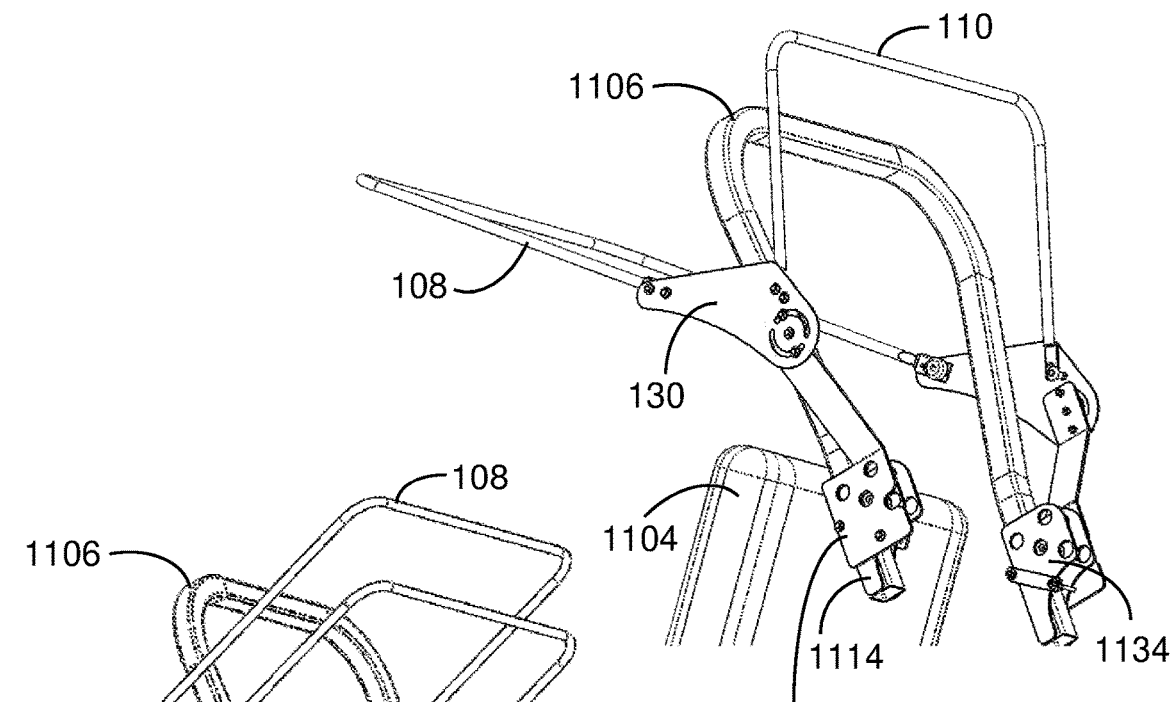
FIGS. 12A-12C show rear left isometric views of the canopy in raised, partially-lowered, and lowered positions, respectively, where the roll bar is raised.
Figure 12B:
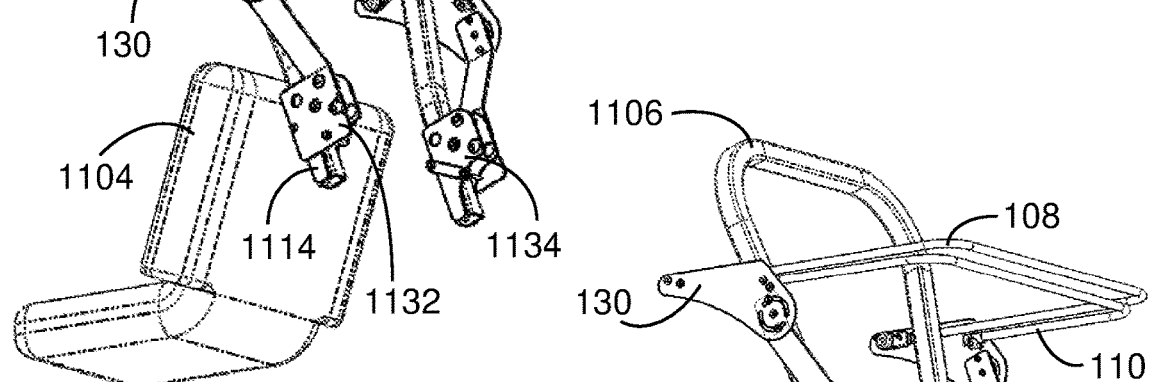
Figure 12C:
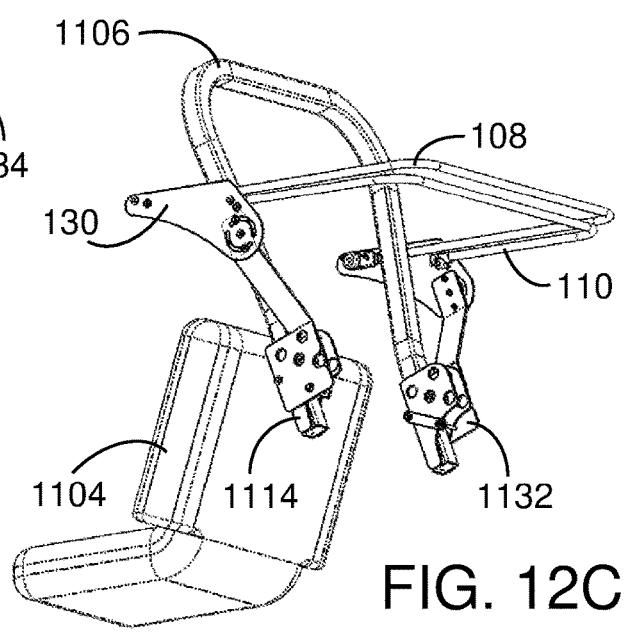

FIGS. 12A-12C show rear left isometric views of the canopy in raised, partially-lowered, and lowered positions where the roll bar is raised. Again, the three illustrated positions of the canopy assembly (raised in FIG. 12A, partially-lowered in FIG. 12B, and fully lowered in FIG. 12C) correspond to the positions also illustrated in previous figures for the first and second embodiments.

FIGS. 13A-13C show isometric rear left views of the canopy in raised, partially-lowered, and lowered positions where the roll bar is fully-lowered, corresponding to a position wherein the roll bar has been pivoted backwards approximately 180° from the raised position in FIGS. 12A-12C. The three positions of the canopy assembly (raised in FIG. 13A, partially-lowered in FIG. 13B, and fully lowered in FIG. 13C) correspond to the positions also illustrated in previous figures for the first and second embodiments.

Attachment Arrangements for the Canopy Mounting Bracket

Various canopy mounting bracket designs and attachment arrangements fall within the scope of this disclosure. The particular choice of canopy mounting bracket design may be determined by the design of a vehicle onto which the retractable canopy of this disclosure is to be mounted.

FIGS. 14A-14H show different mounting arrangements in top (i.e., downward-looking) cross-sectional views for an L-shaped canopy mounting bracket 1432, where each mounting arrangement is shown assuming, for example, the front of a vehicle onto which the retractable canopy is to be mounted is at the left of support structure 1402 and the center of the body of the vehicle is above support structure 1402. In each figure, the support structure 1402 (on the left side of the operator) may correspond to the roll bar support, the roll bar, or the roll bar pivot bracket, depending on the particular retractable canopy installation—and also depending on the design of the motorized vehicle.

Figure 14A:
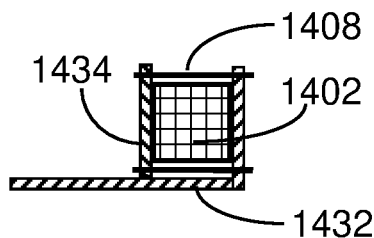
FIGS. 14A-14H show different mounting arrangements for an L-shaped canopy mounting bracket.

FIG. 14A shows a forward-oriented L-shaped canopy mounting bracket 1432 extending around the rear of, and clamped to, support structure 1402 by canopy mounting plate 1434 using mounting bolts 1408.

Figure 14B:
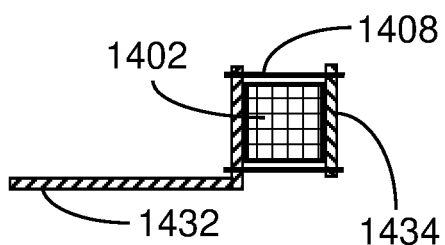

FIG. 14B shows a forward-oriented L-shaped canopy mounting bracket 1432 clamped to the front of support structure 1402 on the outside by canopy mounting plate 1434 using mounting bolts 1408.

Figure 14C:
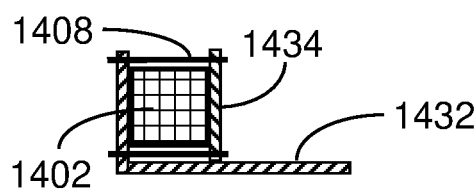

FIG. 14C shows a rear-oriented L-shaped canopy mounting bracket 1432 extending around the front of, and clamped to, support structure 1402 on the outside by canopy mounting plate 1434 using mounting bolts 1408.

Figure 14D:
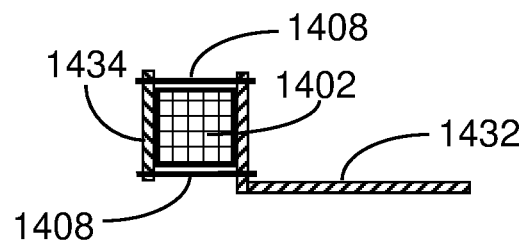

FIG. 14D shows a rear-oriented L-shaped canopy mounting bracket 1432 clamped to the rear of support structure 1402 on the outside by canopy mounting plate 1434 using mounting bolts 1408.

Figure 14E:
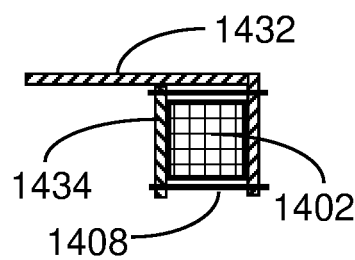

FIG. 14E shows a forward-oriented L-shaped canopy mounting bracket 1432 extending around the rear of, and clamped to, support structure 1402 on the inside by canopy mounting plate 1434 using mounting bolts 1408.

Figure 14F:
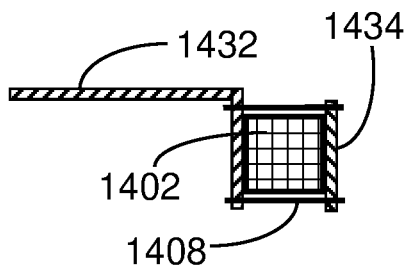

FIG. 14F shows a forward-oriented L-shaped canopy mounting bracket 1432 clamped to the front of support structure 1402 on the inside by canopy mounting plate 1434 using mounting bolts 1408.

Figure 14G:
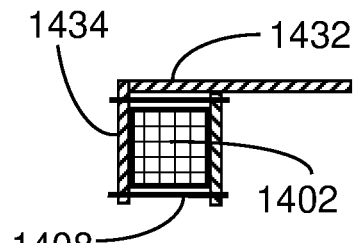

FIG. 14G shows a rear-oriented L-shaped canopy mounting bracket 1432 extending around the front of, and clamped to, support structure 1402 on the inside by canopy mounting plate 1434 using mounting bolts 1408.

Figure 14H:
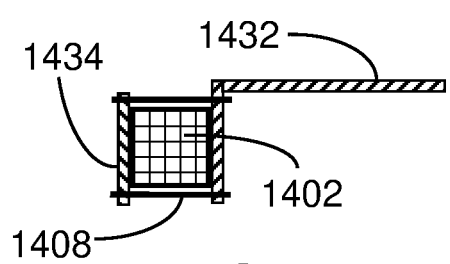

FIG. 14H shows a rear-oriented L-shaped canopy mounting bracket 1432 clamped to the rear of support structure 1402 on the inside by canopy mounting plate 1434 using mounting bolts 1408.

FIGS. 15A-15D show different mounting arrangements in top (i.e., downward-looking) cross-sectional views for a flat canopy mounting bracket, where each mounting arrangement is shown assuming, for example, the front of a vehicle onto which the retractable canopy is to be mounted is at the left of support structure 1502 and the center of the body of the vehicle is above support structure 1502. In each figure, a support structure 1502 (on the left side of the operator) may correspond to the roll bar support, the roll bar, or the roll bar pivot bracket, depending on the particular retractable canopy installation—and also depending on the design of the vehicle.

Figure 15A:
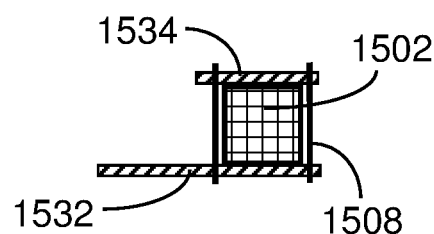
FIGS. 15A-15D show different mounting arrangements for a flat canopy mounting bracket.

FIG. 15A shows a forward-oriented flat canopy mounting bracket 1532 clamped to support structure 1502 on the outside by canopy mounting plate 1534 using mounting bolts 1508.

Figure 15B:
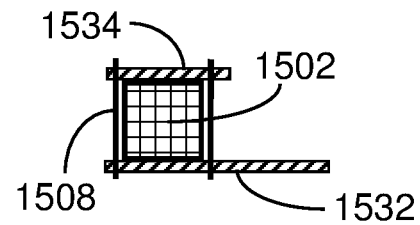

FIG. 15B shows a rear-oriented flat canopy mounting bracket 1532 clamped to support structure 1502 on the outside by canopy mounting plate 1534 using mounting bolts 1508.

Figure 15C:
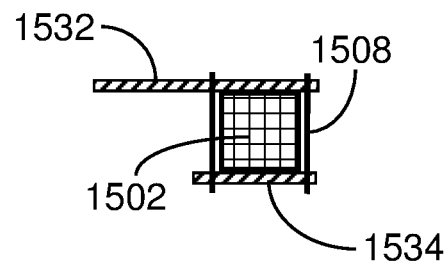

FIG. 15C shows a forward-oriented flat canopy mounting bracket 1532 clamped to support structure 1502 on the inside by canopy mounting plate 1534 using mounting bolts 1508.

Figure 15D:
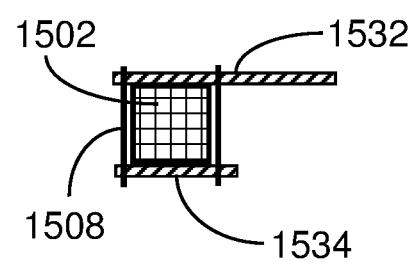

FIG. 15D shows a rear-oriented flat canopy mounting bracket 1532 clamped to the rear of support structure 1502 on the inside by canopy mounting plate 1534 using mounting bolts 1508.

A Fourth Embodiment

Figure 16A:
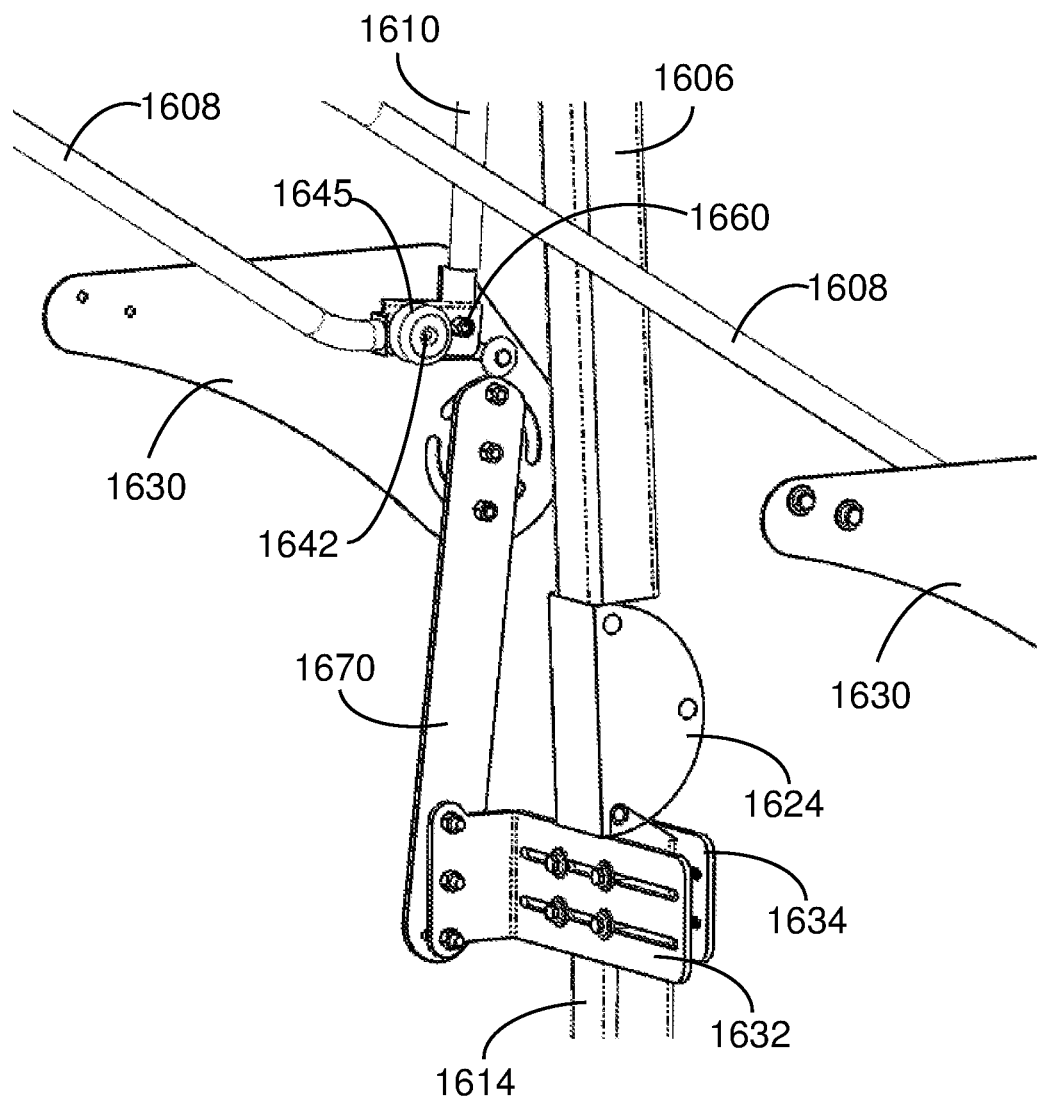
FIGS. 16A-16C show close-up, largely inner front left isometric views of a canopy structure with a single pivoting connection in raised, partially-lowered, and lowered positions, respectively, where the roll bar is raised.
Figure 16B:
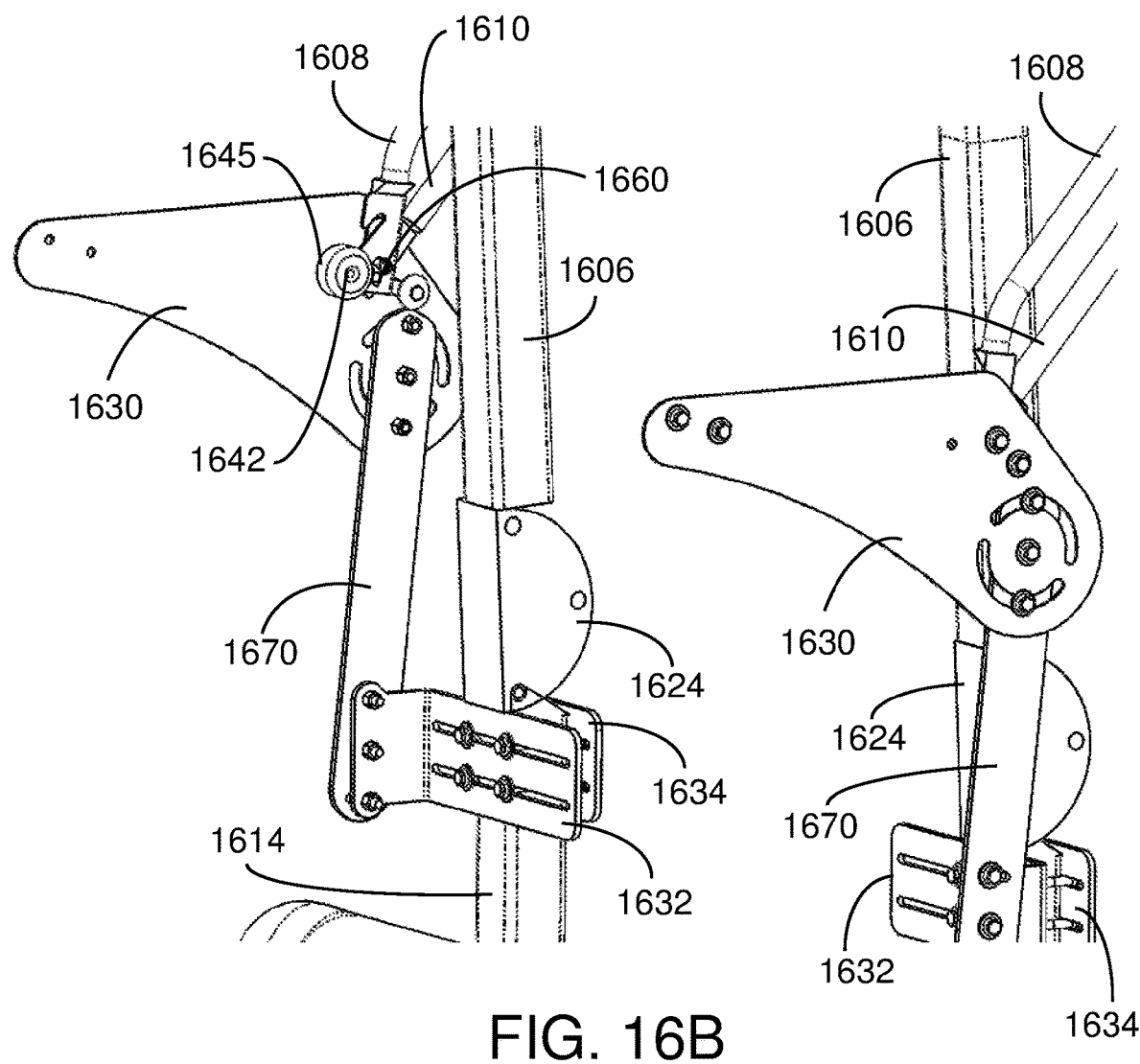
Figure 16C:
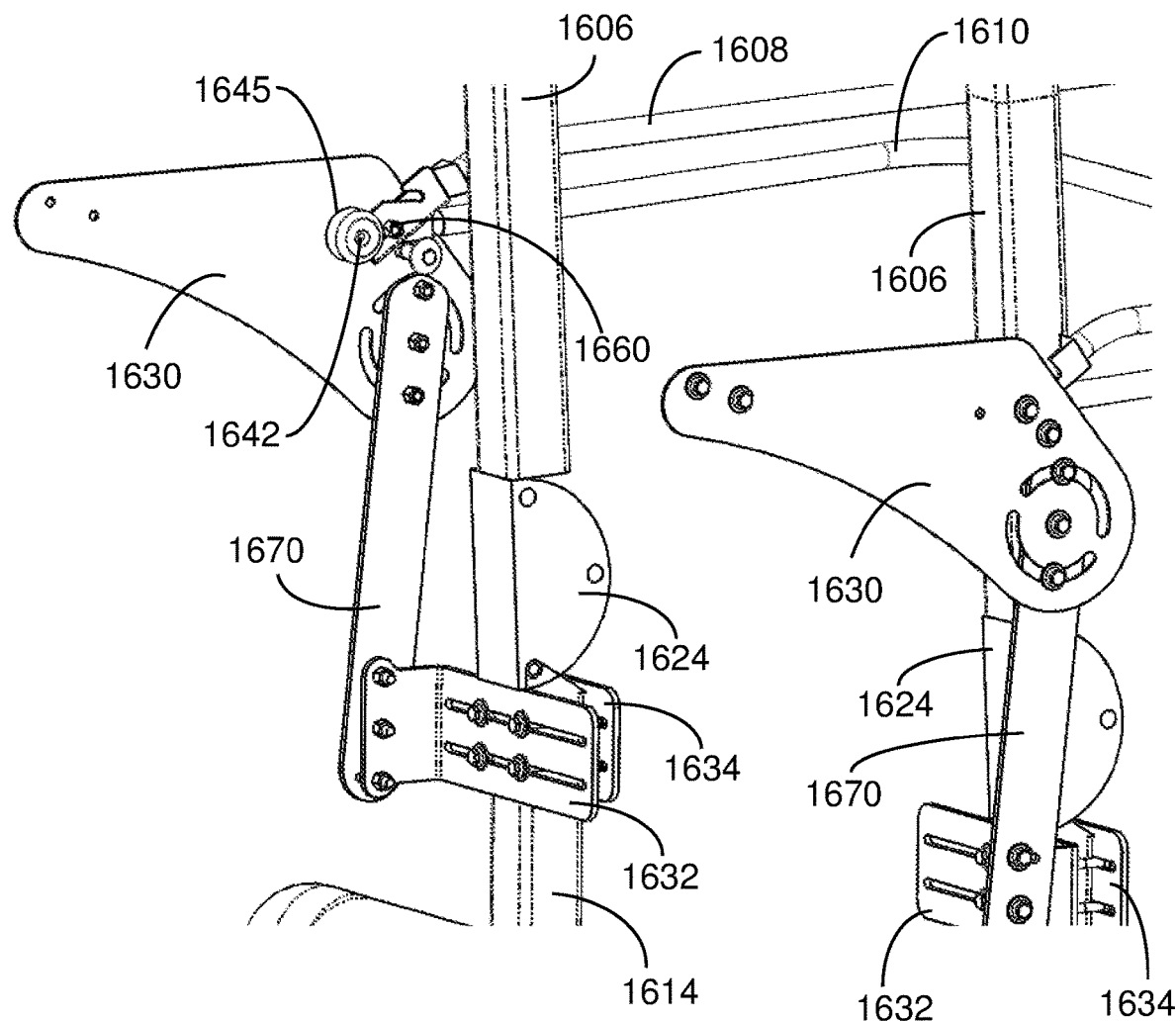

FIGS. 16A-16C show close-up, largely inner front left isometric views of a canopy structure with a single pivoting connection in raised, partially-lowered, and lowered positions, respectively, where the roll bar is raised. Comparisons of FIGS. 16A-16C with FIGS. 10A-10C show that a main difference is that now both the front canopy support 108 and rear canopy support 110 pivot around the same pivoting connection 1660, instead of around two separate pivoting connections.

Canopy support bracket 1630 is mounted on a canopy extension bracket, the other end of which is mounted on a canopy mounting bracket 1632, which is clamped to a roll bar support 1614 by a canopy mounting plate 1634 below a roll bar pivot bracket 1624. In the embodiment of FIGS. 16A-16C, raising and lowering of a roll bar 1606 will not affect the positioning of the canopy assembly. Canopy extension bracket 1670 enables the canopy to be above the roll bar 1606 when the canopy is raised, thereby facilitating independent raising/lowering of the canopy with respect to the roll bar, as well as independent raising/lowering of the roll bar with respect to the canopy. A locking mechanism 1645 may be a nut threaded onto a locking mechanism mounting stud 1642. When locking mechanism 1645 is tightened down onto front canopy support 1608 as shown in FIG. 16A, the canopy is prevented from pivoting forward or backward.

Subassemblies of Embodiments

The retractable canopy assemblies of various embodiments may comprise the following subassemblies:

Canopy Sub-Assembly—the canopy sub-assembly, in some embodiments, comprises the canopy support structure, including the front canopy support 108 and the rear canopy support 110, as well as the canopy top 102 and the canopy rear 112, both typically fabric. Canopy supports 108 and 110 may be pivotally attached to a canopy support bracket 130 and may have locking mechanisms 145A and/or 145B to lock the canopy in a raised position. The canopy sub-assembly may also comprise motion range-limiting features such as pivot stop 143. Such structure may be the same or similar in multiple embodiments, illustrating the versatility of the retractable canopy design disclosed herein. In some embodiments, the pivoting connection for the front canopy support may be in front of the pivoting connection for the rear canopy support. In some embodiments, the pivoting connections for the front and rear canopy supports may be coaxial. In some embodiments, the canopy may have a front edge with a connection to the front canopy support, and a rear edge with a connection to the rear canopy support. In some embodiments, the canopy may extend in front of an attachment to the front canopy support. In some embodiments, the canopy may extend behind an attachment to the rear canopy support.

Canopy Mounting Structure—in various embodiments, canopy mounting structures may be customized to attach to roll bar assemblies of the respective vehicles onto which a retractable canopy is, or is being, mounted. Exemplary canopy mounting structures are illustrated in the various embodiments herein; however, other mounting structures also fall within the scope of this disclosure. A function of a canopy mounting structure may be to attach the canopy support bracket 130 (in a canopy assembly) to a vehicle. A particular attachment point may be on a roll bar (as illustrated in FIGS. 1A-8C for a first embodiment), on a roll bar support (as illustrated in FIGS. 9A-10C for a second embodiment), or on a roll bar pivot bracket (as illustrated in FIGS. 11A-13C for a third embodiment). FIGS. 14A-15D further illustrate various attachment alternatives, although these are not the only alternatives available, and other methods for attachment of the canopy support bracket to a vehicle fall within the scope of this disclosure. Some canopy mounting structures may comprise a canopy extension bracket to connect the canopy assembly to a canopy mounting bracket (as illustrated in the second and third embodiments shown in FIGS. 9A-13C).

Vehicle—in some embodiments, a retractable canopy and associated structures may be configured for attachment to a vehicle by means of various canopy mounting structures. Typical vehicles may be configured with roll bar assemblies for safety considerations in the event of a vehicle roll-over event. In some vehicles, the roll bar may have a fixed (non-retractable) structure, while in other vehicles the roll bar may be configured with a roll bar pivot bracket enabling the roll bar to be retracted. Some embodiments may be installed on both types of vehicles, and in various locations on a vehicle. Some embodiments herein comprise installations of a retractable canopy assembly on a roll bar, on a roll bar support, or on a roll bar pivot bracket, although other installation sites also fall within the scope of this disclosure. Some embodiments may be configured on vehicles not having a roll bar.

Although the present invention and its advantages have been described in detail, it should be understood that various changes, substitutions and alterations can be made to the embodiments described herein without departing from the scope of the invention as defined by the appended claims. Moreover, the scope of the present application is not intended to be limited to the particular embodiments of the process, machine, manufacture, composition of matter, means, methods and steps described in the specification.

As one of ordinary skill in the art will readily appreciate from this disclosure, processes, machines, manufacture, compositions of matter, means, methods, or steps, presently existing or later to be developed that perform substantially the same function or achieve substantially the same result as the corresponding embodiments described herein may be utilized according to, and in view of, this disclosure. Accordingly, the appended claims are intended to include within their scope such processes, machines, manufacture, compositions of matter, means, methods, or steps.

I claim:

1. A vehicle, comprising:
   a roll bar assembly, including:
      a roll bar;
      a roll bar support; and
      a roll bar pivot bracket, the roll bar pivot bracket operable to enable pivoting motion between the roll bar and the roll bar support;
   a canopy mounting structure, the canopy mounting structure being attached to the vehicle;
   a canopy support bracket, the canopy support bracket being attached to the canopy mounting structure; and
   a canopy sub-assembly, including:
      a front canopy support, having a first pivoting connection to the canopy support bracket;
      a rear canopy support, having a second pivoting connection to the canopy support bracket; and
      a canopy, having a front edge, the front edge having a first connection to the front canopy support, and a rear edge, the rear edge having a second connection to the rear canopy support;
   in which:
      the canopy sub-assembly is movable to a raised canopy position over a vehicle occupant by pivoting the front and rear canopy supports in a first direction, the canopy sub-assembly is movable to a lowered canopy position by pivoting the front and rear canopy supports in a second direction, the second direction being opposite from the first direction;
      the canopy mounting structure is attached to the roll bar support below the roll bar pivot bracket;
      the roll bar is pivotable to a raised roll bar position at the roll bar pivot bracket in a third direction and the roll bar is pivotable to a lowered roll bar position at the roll bar pivot bracket in a fourth direction, the fourth direction being opposite from the third direction;
      the pivoting motion of the canopy sub-assembly is independent of the pivoting motion of the roll bar; and
      both the front canopy support and the rear canopy support are operable to pivot around the outside of the roll bar, or both the front canopy support and the rear canopy support are operable to pivot within the inside of the roll bar, thereby allowing the roll bar to be pivoted between the raised roll bar position and the lowered roll bar position regardless of whether the canopy is in the raised canopy position or the lowered canopy position, and allowing the canopy to moved between the raised canopy position and the lowered canopy position regardless of whether the roll bar is in the raised roll bar position or the lowered roll bar position.

2. The vehicle of claim 1, in which the canopy support bracket is pivotally attached to the canopy mounting structure.

3. The vehicle of claim 1, further comprising a locking mechanism, the locking mechanism operable to maintain the front canopy support in the raised canopy position; in which the locking mechanism comprises:
   a locking screw; and
   a slot in the front canopy support, operable to fit over the locking screw when the front canopy support is pivoted to place the canopy in the raised canopy position.

4. A retractable canopy assembly for a vehicle, comprising:
   a canopy mounting structure, the canopy mounting structure configured to be attached to a pivotable roll bar of the vehicle, the pivotable roll bar having a roll bar pivot bracket and the canopy mounting structure adapted to be mounted below the roll bar pivot bracket;
   a canopy support bracket, the canopy support bracket configured to be attached to the canopy mounting structure and having a pivot point to allow adjustment of the angle between the canopy support bracket and the canopy mounting structure; and
   a canopy sub-assembly, including:
      a front canopy support, having a first pivoting connection to the canopy support bracket;
      a rear canopy support, having a second pivoting connection to the canopy support bracket; and
      a canopy, having a first connection to the front canopy support, and having a second connection to the rear canopy support; and
   in which the canopy is movable to a raised canopy position by pivoting the front and rear canopy supports in a first direction and the canopy is movable to a lowered canopy position by pivoting the front and rear canopy supports in a second direction, the second direction being opposite from the first direction, thereby allowing the canopy, when mounted on a vehicle with a pivotable roll bar, to be moved between the raised canopy position and the lowered canopy position regardless of the position of the pivotable roll bar, and allowing the pivotable roll bar to be pivoted regardless of the position of the canopy.

5. The retractable canopy assembly of claim 4, in which the first connection to the front canopy support is at a front edge of the canopy and the second connection to the rear canopy support is at a rear edge of the canopy.

6. The retractable canopy assembly of claim 4, in which the vehicle comprises:
a roll bar assembly, including:
the pivotable roll bar;
a roll bar support; and
a roll bar pivot bracket, the roll bar pivot bracket operable to enable pivoting motion between the roll bar and the roll bar support; and
in which:
the canopy mounting structure is attached to one of the roll bar support, the roll bar, or the roll bar pivot bracket;
the roll bar is pivotable to a raised roll bar position at the roll bar pivot bracket in a third direction and the roll bar is pivotable to a lowered roll bar position at the roll bar pivot bracket in a fourth direction, the fourth direction being opposite from the third direction;
the pivoting motion of the roll bar in the third and fourth directions is independent of the canopy position; and
both the front canopy support and the rear canopy support are operable to pivot around the outside of the roll bar, or both the front canopy support and the rear canopy support are operable to pivot within the inside of the roll bar.

7. The retractable canopy assembly of claim 4, in which the canopy support bracket is pivotally attached to the canopy mounting structure.

8. The retractable canopy assembly of claim 4, further comprising a locking mechanism, the locking mechanism operable to maintain the front canopy support in the raised canopy position; wherein the locking mechanism comprises:
a locking screw; and
a slot in the front canopy support, operable to fit over the locking screw when the front canopy support is pivoted to place the canopy in the raised canopy position.

9. The retractable canopy assembly of claim 4, further comprising a pivot stop, the pivot stop being operable to limit a range of pivoting motion of the rear canopy support.

10. The retractable canopy assembly of claim 9, further comprising a locking mechanism, the locking mechanism operable to maintain the front canopy support in the raised canopy position; wherein the locking mechanism comprises:
a locking screw, operable to fit under the first pivoting connection to the canopy support bracket; and
a slot in the front canopy support, operable to enclose the pivot stop when the front canopy support is pivoted to place the canopy in the raised canopy position.

11. The retractable canopy assembly of claim 4, further comprising a canopy extension bracket.

12. The retractable canopy assembly of claim 6, wherein the roll bar is retractable, and wherein the pivoting motion of the canopy in the first and second directions is independent of the position of the roll bar.

13. A kit operable to install a retractable canopy assembly onto a vehicle, the kit comprising:
the retractable canopy assembly of claim 4;
in which:
in the retractable canopy assembly, both the front canopy support and the rear canopy support are operable to pivot around the outside of the roll bar, or both the front canopy support and the rear canopy support are operable to pivot within the inside of the roll bar.

14. The kit of claim 13, wherein in the retractable canopy assembly, the canopy support bracket is pivotally attached to the canopy mounting structure.

15. The kit of claim 13, the retractable canopy assembly further comprising a locking mechanism, the locking mechanism operable to maintain the front canopy support in the raised canopy position.

16. The kit of claim 15, wherein in the retractable canopy assembly, the locking mechanism comprises:
a locking screw; and
a slot in the front canopy support, operable to fit over the locking screw when the front canopy support is pivoted to place the canopy in the raised canopy position.

17. The kit of claim 13, the retractable canopy assembly further comprising a pivot stop, the pivot stop being operable to limit a range of pivoting motion of the rear canopy support.

18. The kit of claim 13, wherein in the retractable canopy assembly, the canopy mounting structure further comprises a canopy extension bracket.

19. The kit of claim 13, wherein the roll bar is retractable, and wherein the pivoting motion of the canopy in the first and second directions is independent of the position of the roll bar.

20. The kit of claim 13, wherein the pivoting motion of the roll bar is independent of the position of the canopy sub-assembly.

21. A vehicle, comprising:
a roll bar assembly, including:
a roll bar;
a roll bar support; and
a roll bar pivot bracket, the roll bar pivot bracket operable to enable pivoting motion between the roll bar and the roll bar support; and
the retractable canopy assembly of claim 4;
wherein:
the roll bar is pivotable to a raised roll bar position at the roll bar pivot bracket in a third direction and the roll bar is pivotable to a lowered roll bar position at the roll bar pivot bracket in a fourth direction, the fourth direction being opposite from the third direction;
the pivoting motions of the roll bar in the third and fourth directions and the pivoting motions of the canopy sub-assembly in the first and second directions are independent; and
both the front canopy support and the rear canopy support are operable to pivot around the outside of the roll bar, or both the front canopy support and the rear canopy support are operable to pivot within the inside of the roll bar.

22. The vehicle of claim 21, the retractable canopy assembly further comprising a locking mechanism, the locking mechanism operable to maintain the front canopy support in the raised canopy position, the locking mechanism comprising:
a locking screw; and
a slot in the front canopy support, operable to fit over the locking screw when the front canopy support is pivoted to place the canopy in the raised canopy position.

23. A retractable canopy for a vehicle having a roll bar, the roll bar mounted via a roll bar pivot bracket to a roll bar support, and movable between a deployed roll bar position in which the roll bar extends above a driver's head to protect a driver during a vehicle roll over and a retracted roll bar position in which the roll bar is lowered to avoid interference with obstacles, the retractable canopy comprising:

a canopy assembly operable to provide weather protection for a vehicle driver;

a canopy support operable to support the canopy; and a canopy mounting bracket operable to mount the canopy to the roll bar support below the roll bar pivot bracket, the canopy mounting bracket and canopy support operable to allow the canopy to move between a deployed canopy position, in which the canopy provides weather protection for the vehicle driver and a retracted canopy position in which the canopy is positioned lower than when the canopy is in the deployed canopy position; the canopy, canopy support, and canopy mounting bracket operable to allow the canopy to be moved between the deployed canopy position and the retracted canopy position when the roll bar is in either the deployed roll bar position or the retracted roll bar position; and wherein the canopy assembly includes a front canopy support and a rear canopy support, each of the front and rear canopy supports having a separate pivoting connection to the canopy support and wherein the canopy is operable to move around the outside of the roll bar, or the canopy is operable to move within the inside of the roll bar.

24. The retractable canopy of claim 21 in which the retractable canopy in the raised position is above the roll bar when the roll bar is in the raised position.

25. The vehicle of claim 1 in which the retractable canopy in the raised position is above the roll bar when the roll bar is in the raised position.

26. The retractable canopy of claim 4, further comprising:
a canopy extension bracket connected to the canopy mounting structure such that the angle of the canopy extension bracket relative to the canopy mounting structure is adjustable;
in which the canopy support bracket is connected to the canopy extension bracket.

* * * * *